US011890818B2

(12) United States Patent
Singov

(10) Patent No.: US 11,890,818 B2
(45) Date of Patent: Feb. 6, 2024

(54) 3D PRINTER

(71) Applicant: Sergey Singov, Dayton, TX (US)

(72) Inventor: Sergey Singov, Dayton, TX (US)

( * ) Notice: Subject to any disclaimer, the term of this patent is extended or adjusted under 35 U.S.C. 154(b) by 0 days.

(21) Appl. No.: 18/141,381

(22) Filed: Apr. 29, 2023

(65) Prior Publication Data

US 2023/0264429 A1  Aug. 24, 2023

Related U.S. Application Data

(63) Continuation of application No. 16/504,836, filed on Jul. 8, 2019, now abandoned, which is a continuation
(Continued)

(51) Int. Cl.
| | |
|---|---|
| *B29C 64/40* | (2017.01) |
| *B33Y 70/00* | (2020.01) |
| *B33Y 10/00* | (2015.01) |
| *B33Y 30/00* | (2015.01) |
| *B29C 64/165* | (2017.01) |
| *B22F 7/00* | (2006.01) |
| *B22F 7/06* | (2006.01) |
| *B22F 3/115* | (2006.01) |
| *B22F 10/14* | (2021.01) |
| *B22F 12/55* | (2021.01) |
| *B22F 10/43* | (2021.01) |

(Continued)

(52) U.S. Cl.
CPC .............. *B29C 64/40* (2017.08); *B22D 23/06* (2013.01); *B22F 3/115* (2013.01); *B22F 7/008* (2013.01); *B22F 7/06* (2013.01); *B22F 10/14* (2021.01); *B22F 10/43* (2021.01); *B22F 12/55* (2021.01); *B28B 1/001* (2013.01); *B29C 64/165* (2017.08); *B33Y 10/00* (2014.12); *B33Y 30/00* (2014.12); *B33Y 70/00* (2014.12); *B22F 2007/066* (2013.01); *B22F 2999/00* (2013.01); *B29K 2063/00* (2013.01)

(58) Field of Classification Search
CPC ..................................................... B29C 64/40
See application file for complete search history.

(56) References Cited

U.S. PATENT DOCUMENTS

| | | | | |
|---|---|---|---|---|
| 5,555,481 A | * | 9/1996 | Rock ....................... | B29C 64/40 419/45 |
| 2013/0316149 A1 | * | 11/2013 | Atkins .................. | B29C 64/112 264/401 |

* cited by examiner

*Primary Examiner* — Christopher S Kessler
(74) *Attorney, Agent, or Firm* — Cognition IP, P.C.; Edward Steakley

(57) ABSTRACT

An apparatus for dispensing build powder and support powder, in a sequence of layers, and having a frame and a container. Also, a build powder pourer is at least partially filled with build powder and a support powder pourer at least partially filled with support powder, each of the pourers having a dispensing opening and a dispensing plug, controllably covering the dispensing opening. Further, a pourer-movement and dispensing plug-actuating assembly is supported by the frame over the container and includes a movement element that is selectively attachable to the build powder pourer and alternately to the support powder pourer and also capable to controllably move an attached pourer in three orthogonal dimensions and to control the dispensing plug. In addition, at least one docking station for holding a first one of the pourers; and a computing assembly controls the pourer-movement and dispensing plug-actuating assembly to create a target shape.

20 Claims, 38 Drawing Sheets

Related U.S. Application Data of application No. 15/889,664, filed on Feb. 6, 2018, now Pat. No. 10,391,713, which is a continuation of application No. PCT/US2017/052593, filed on Sep. 20, 2017.

(60) Provisional application No. 62/397,549, filed on Sep. 21, 2016.

(51) Int. Cl.
*B22D 23/06* (2006.01)
*B28B 1/00* (2006.01)
*B29K 63/00* (2006.01)

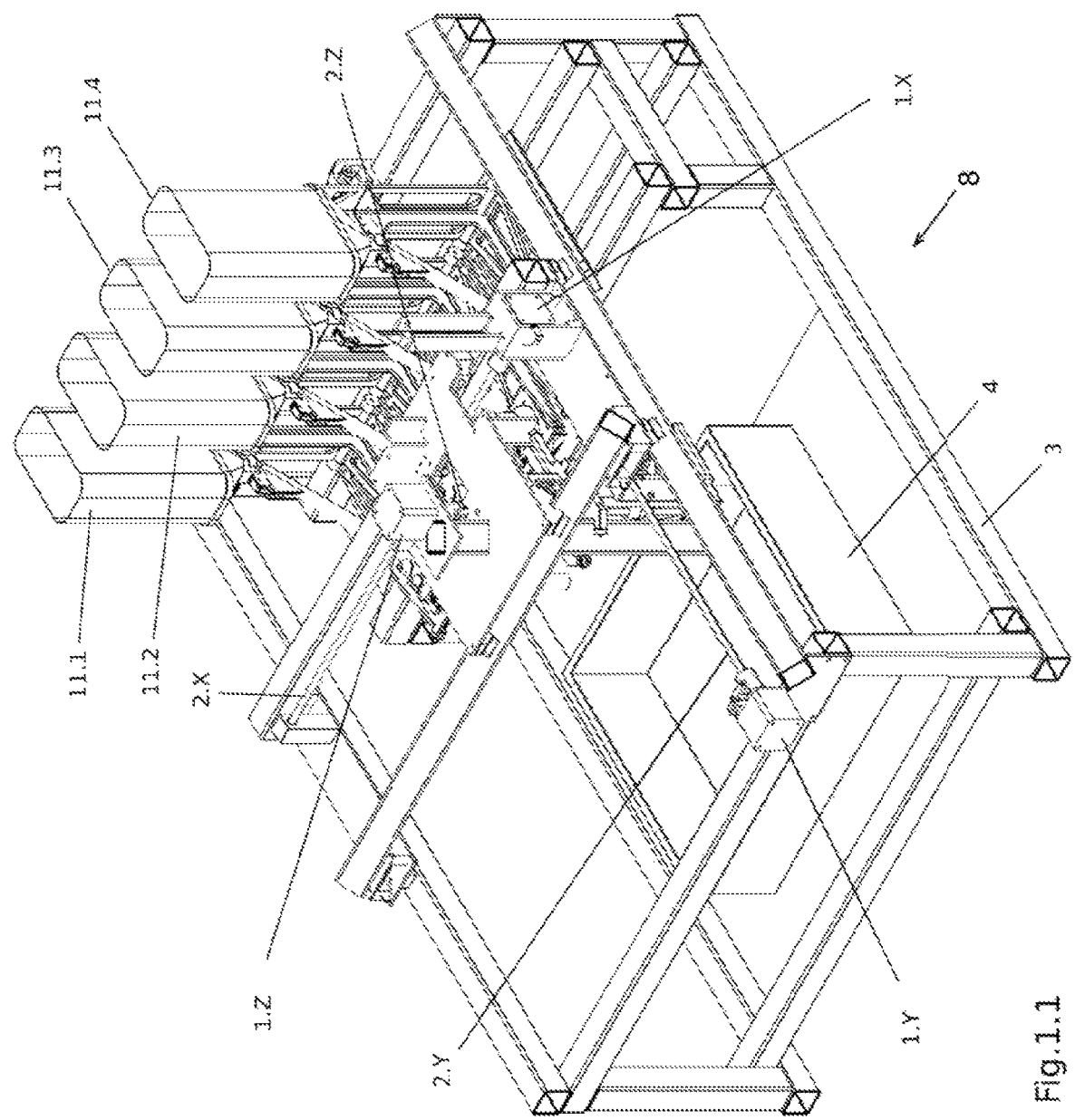
Fig.1.1

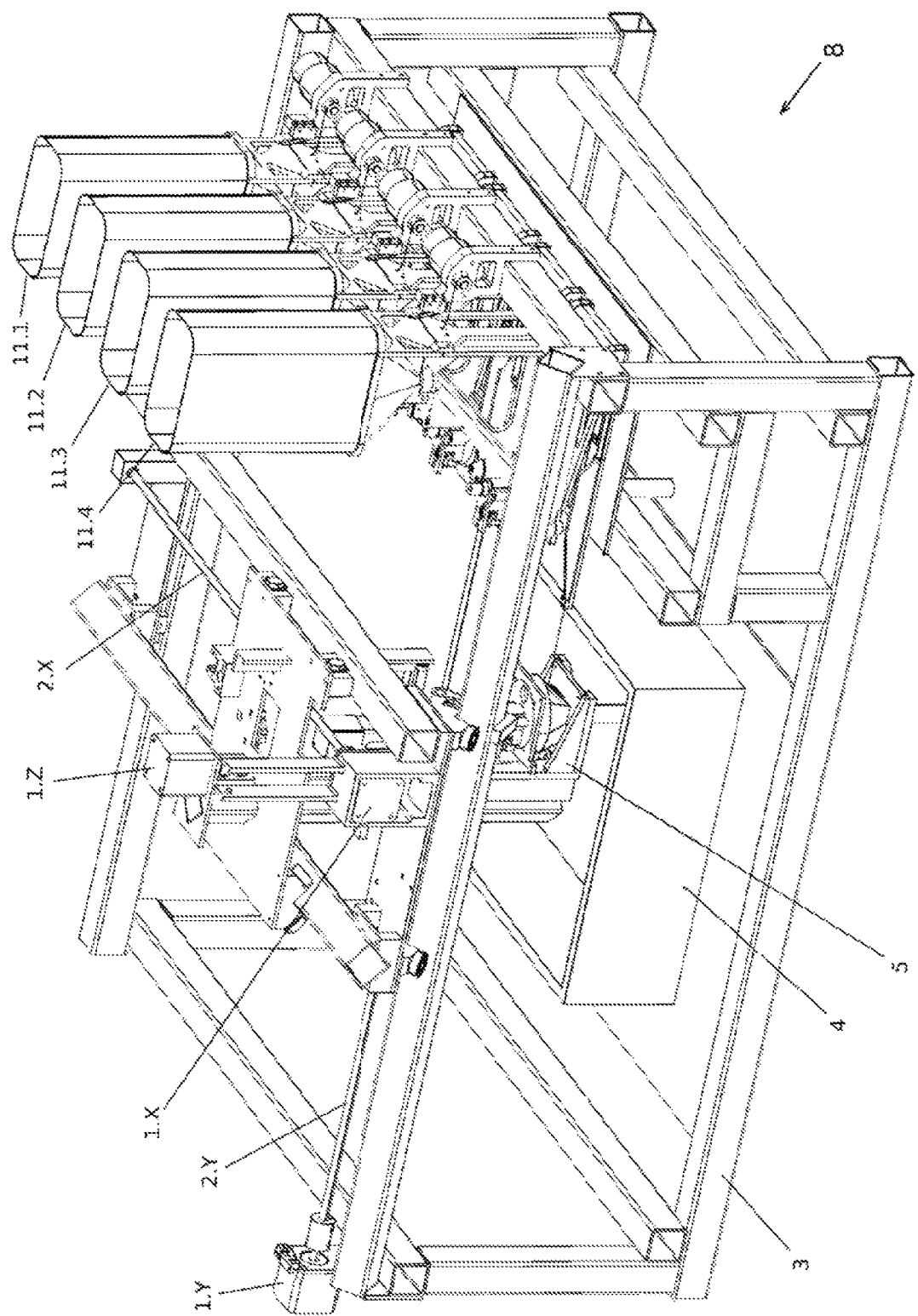
Fig.1.2

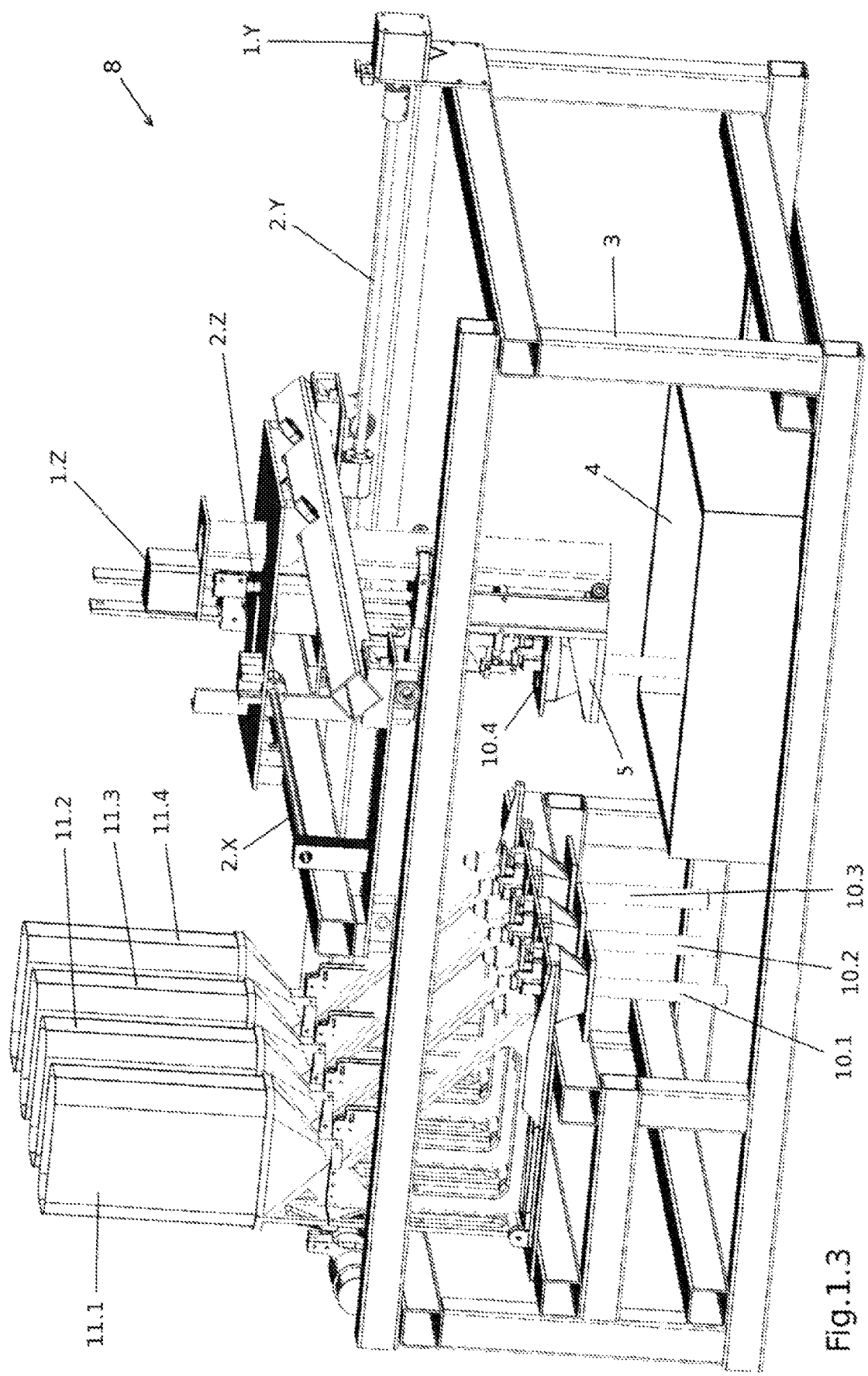
Fig.1.3

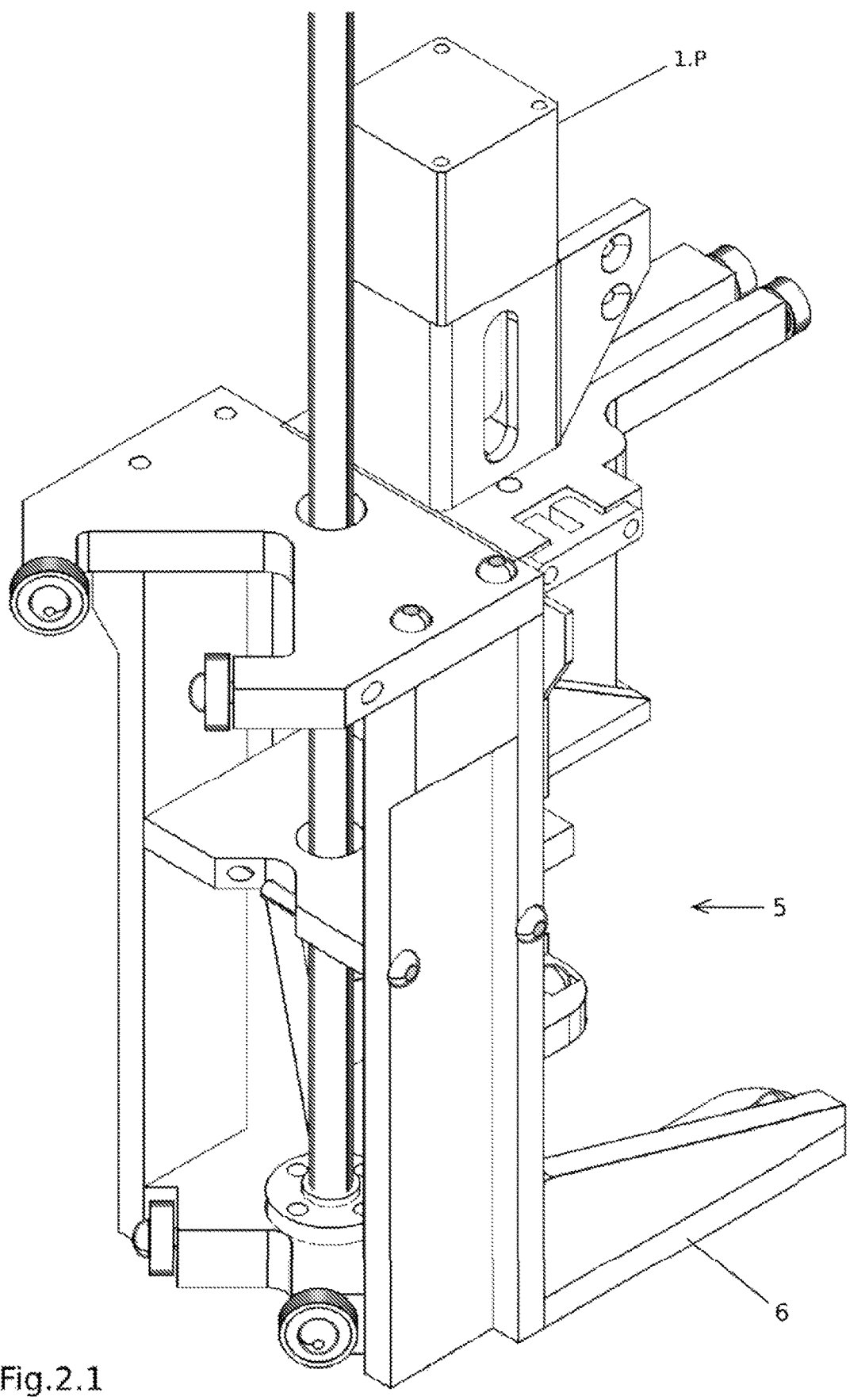
Fig.2.1

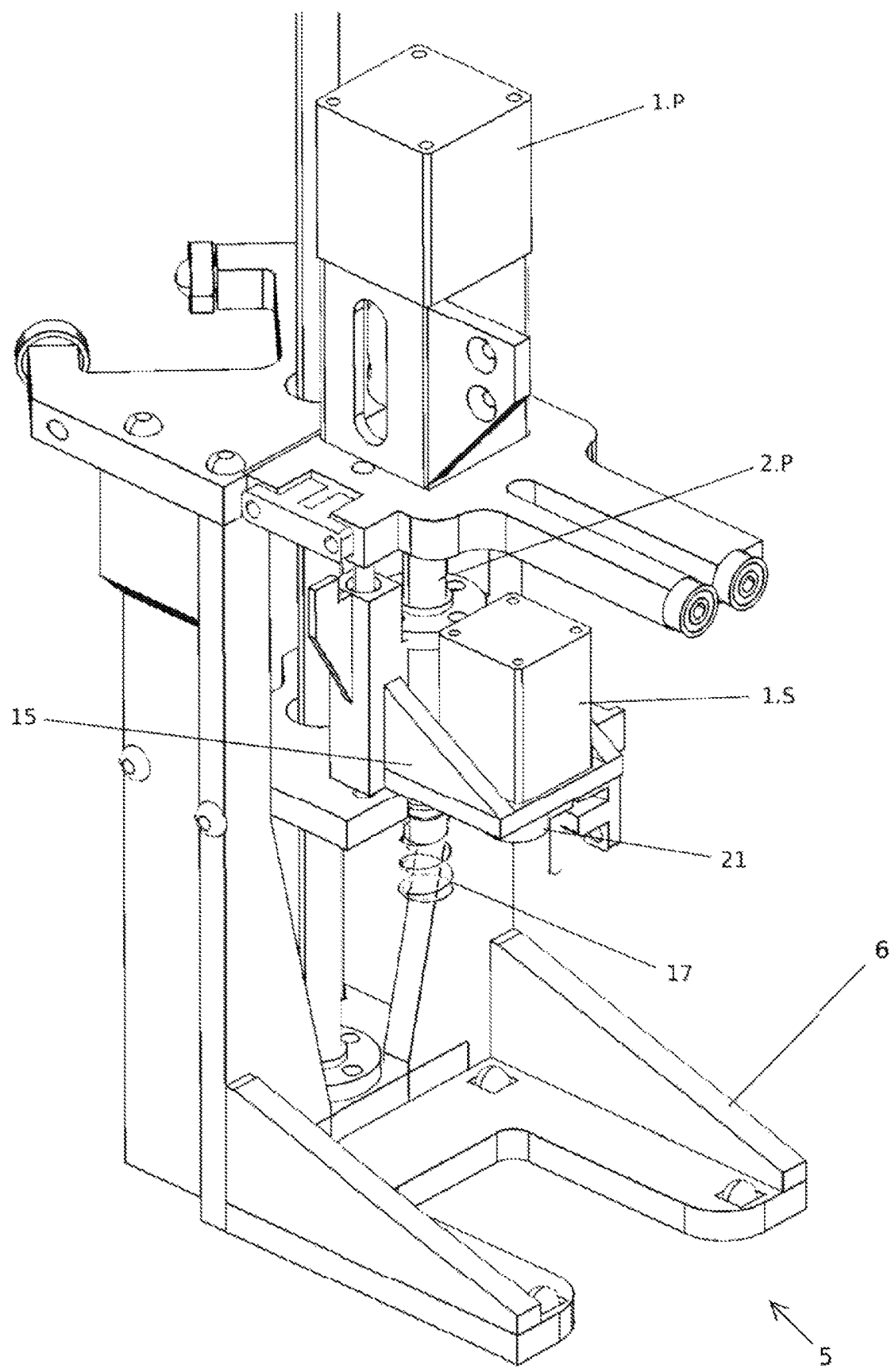
Fig. 2.2

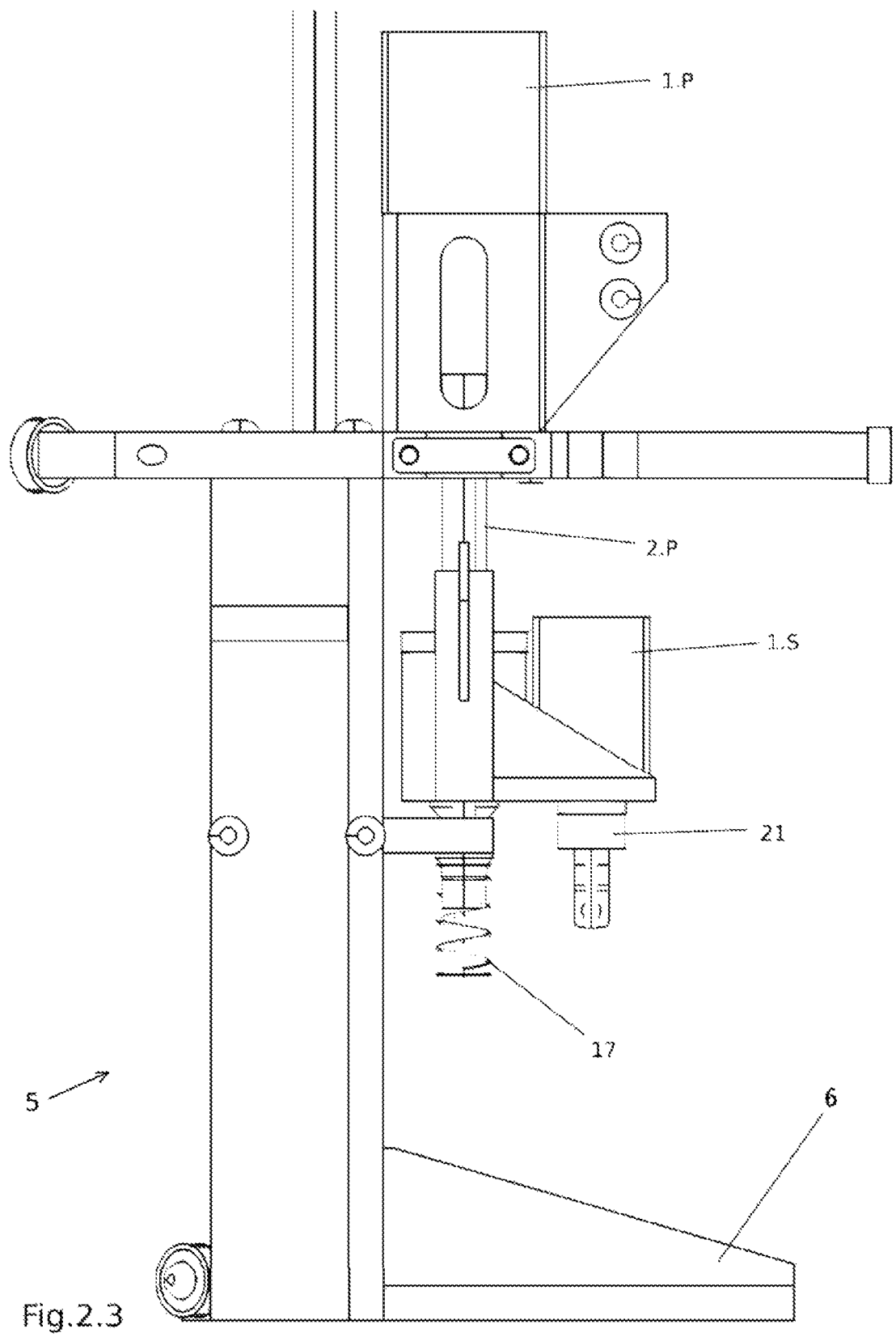
Fig.2.3

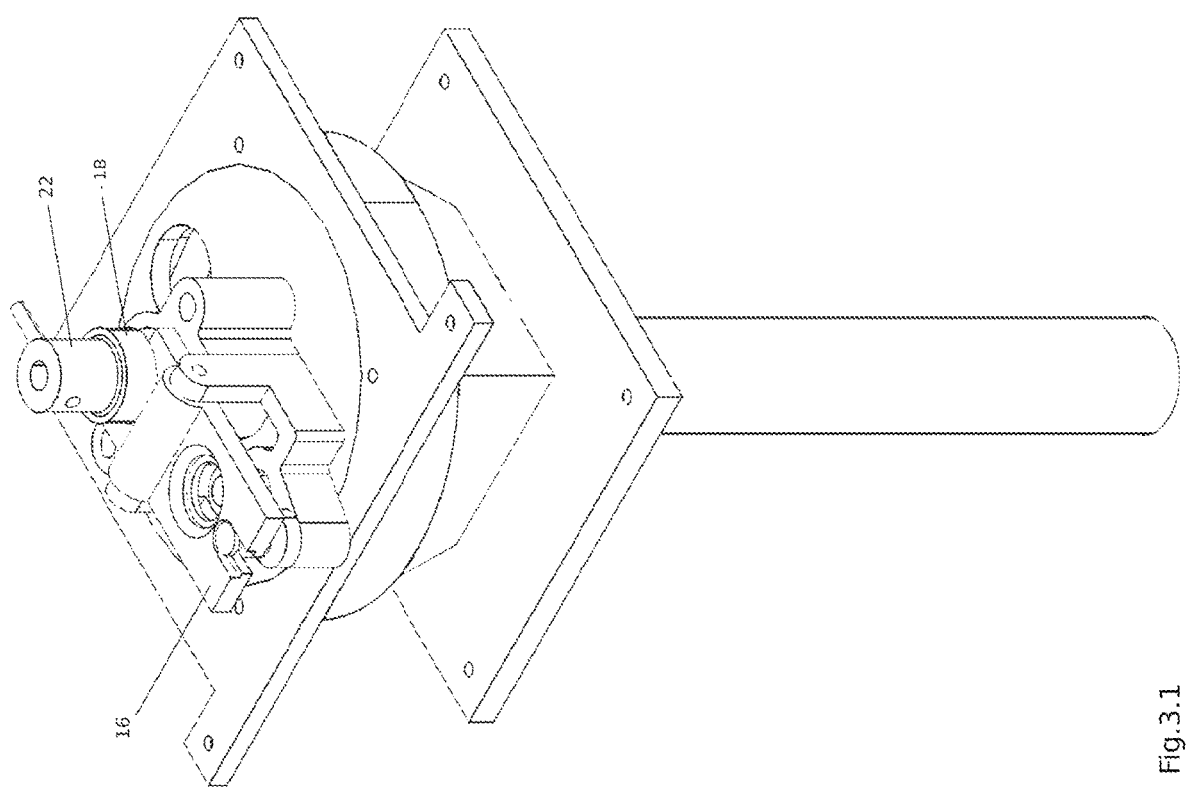
Fig.3.1
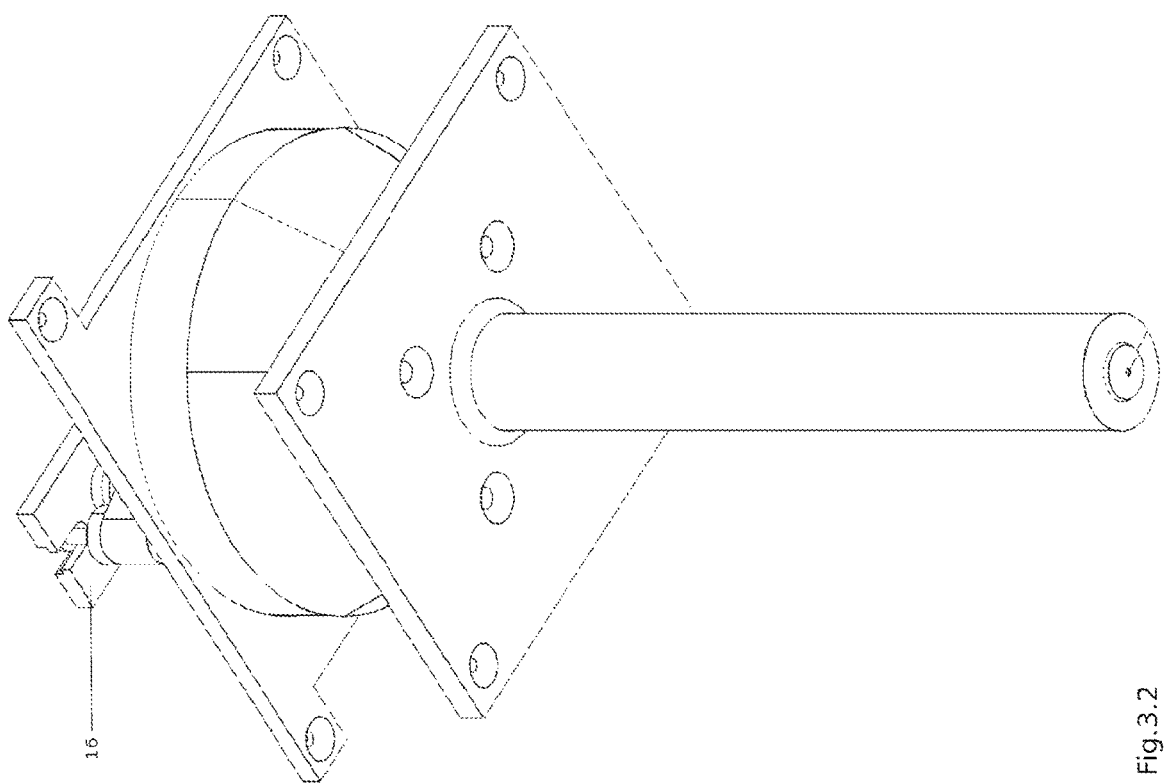
Fig.3.2

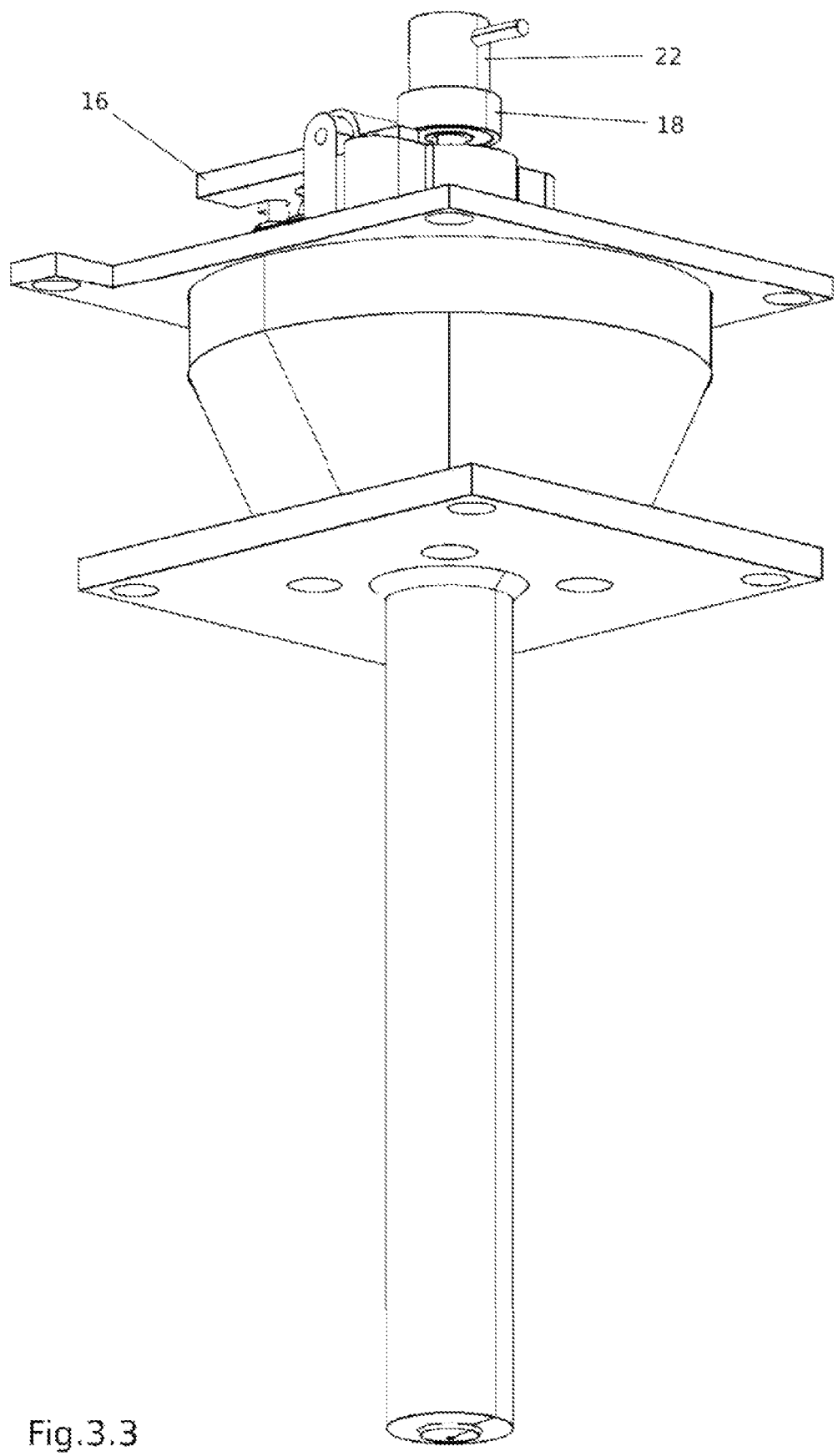
Fig.3.3

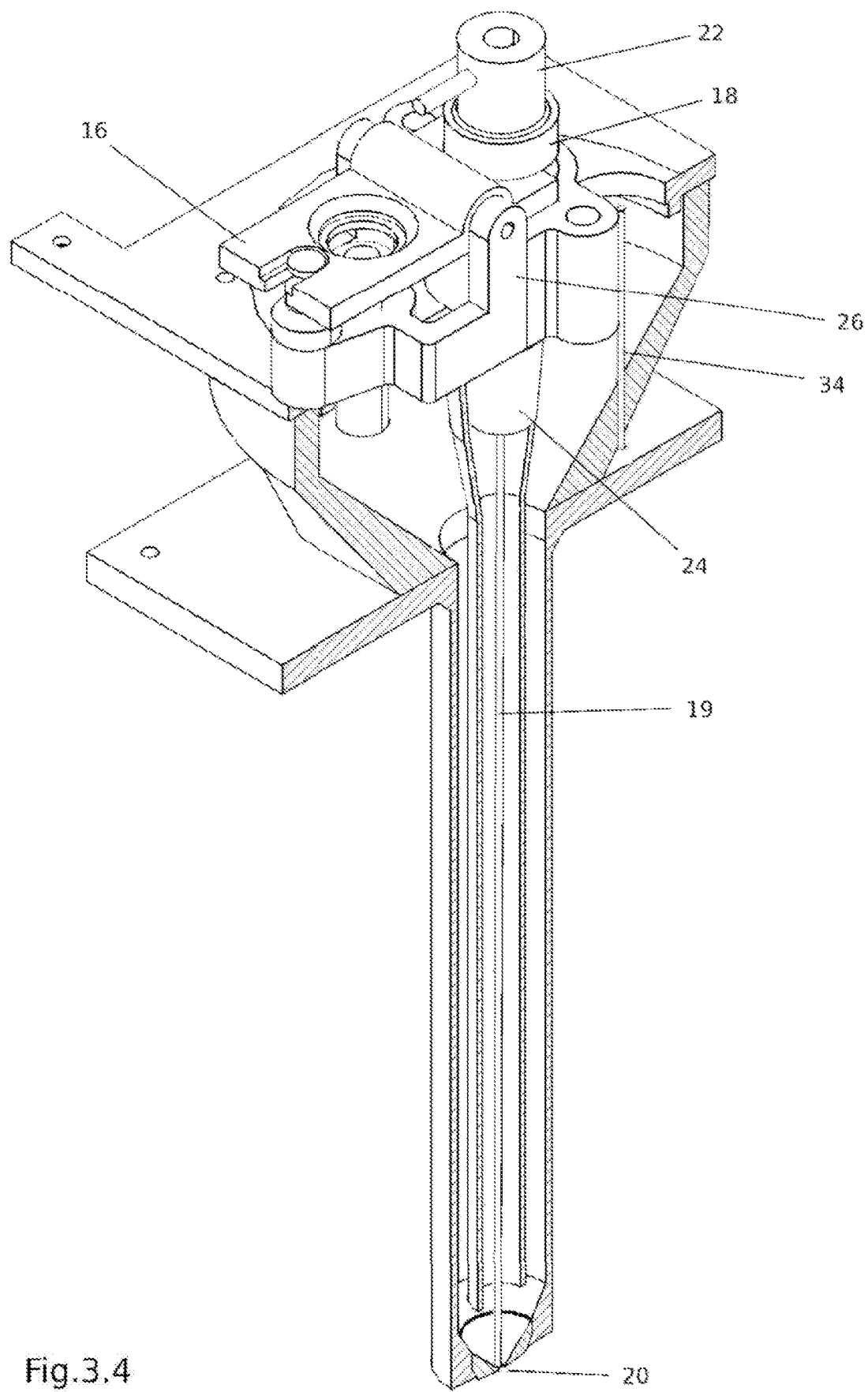
Fig.3.4

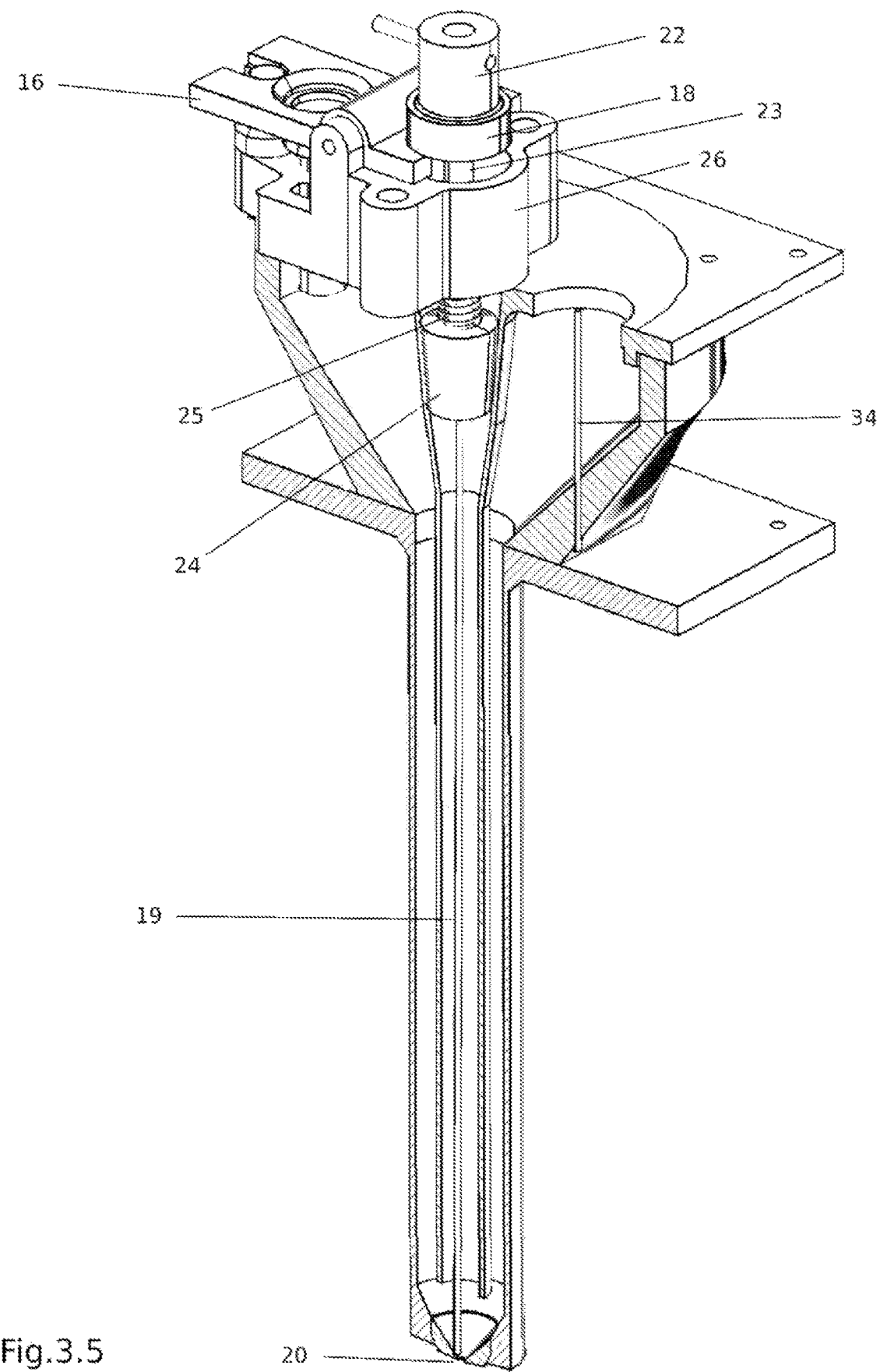
Fig.3.5

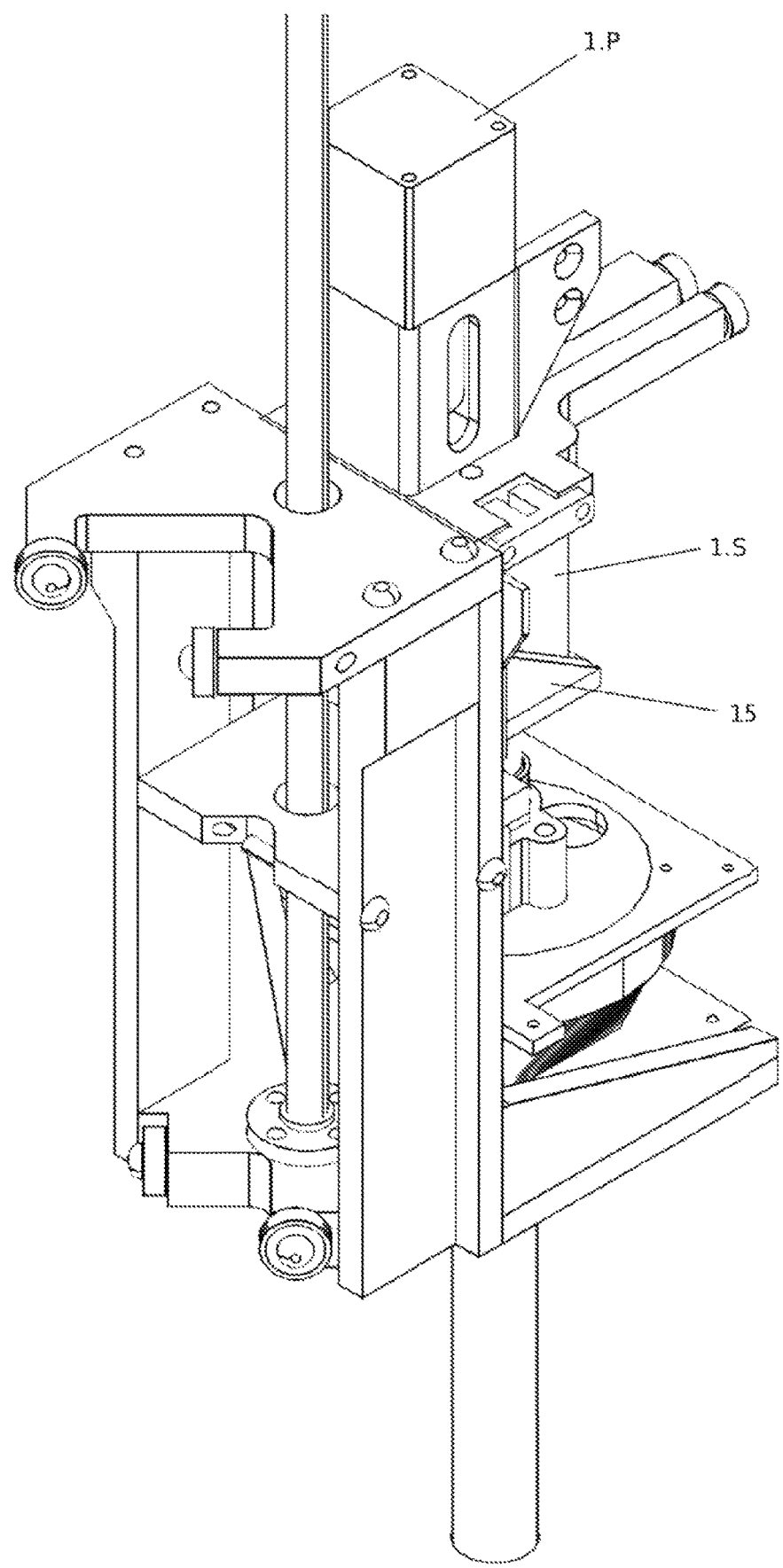
Fig.4.1

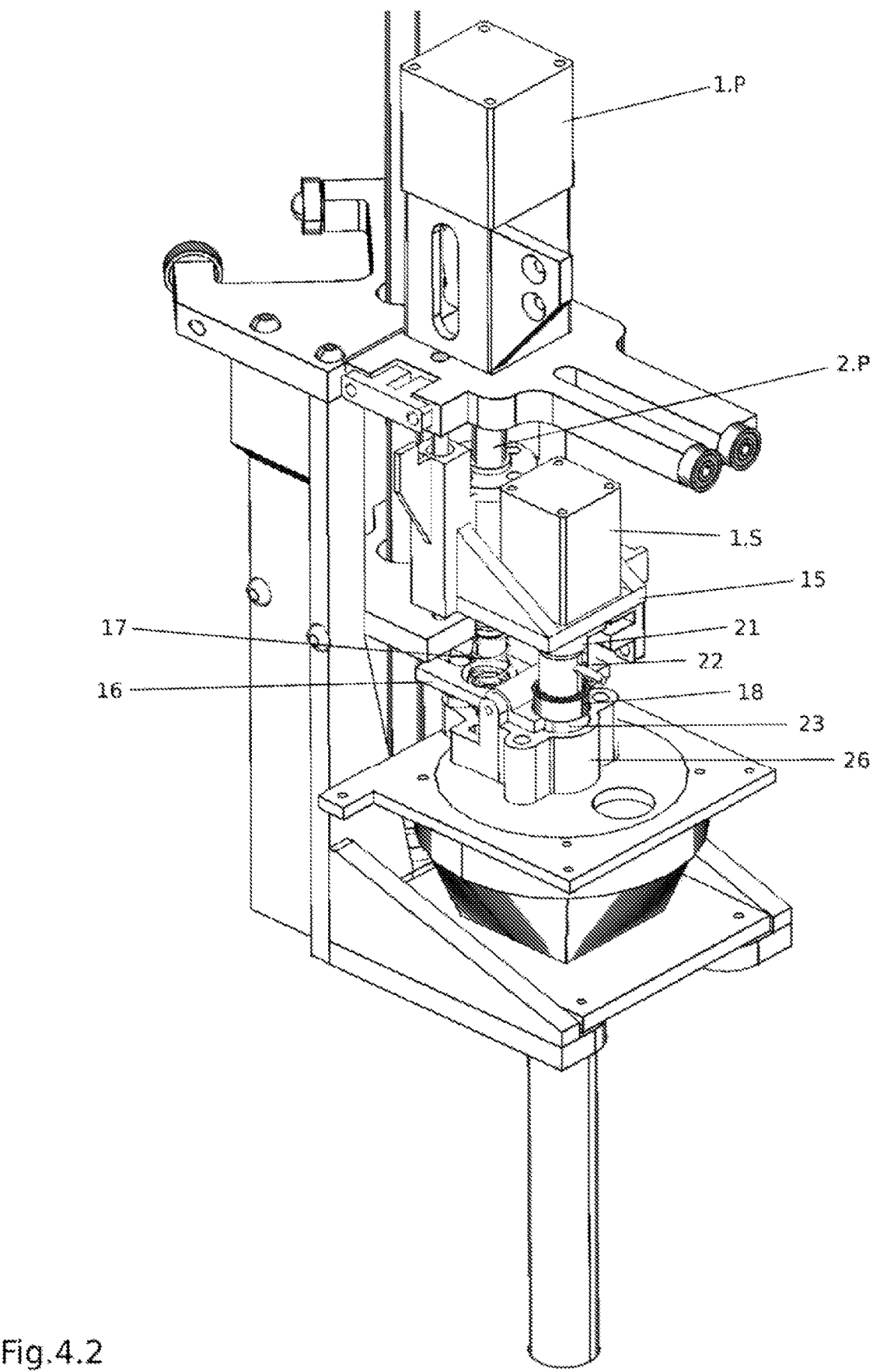
Fig.4.2

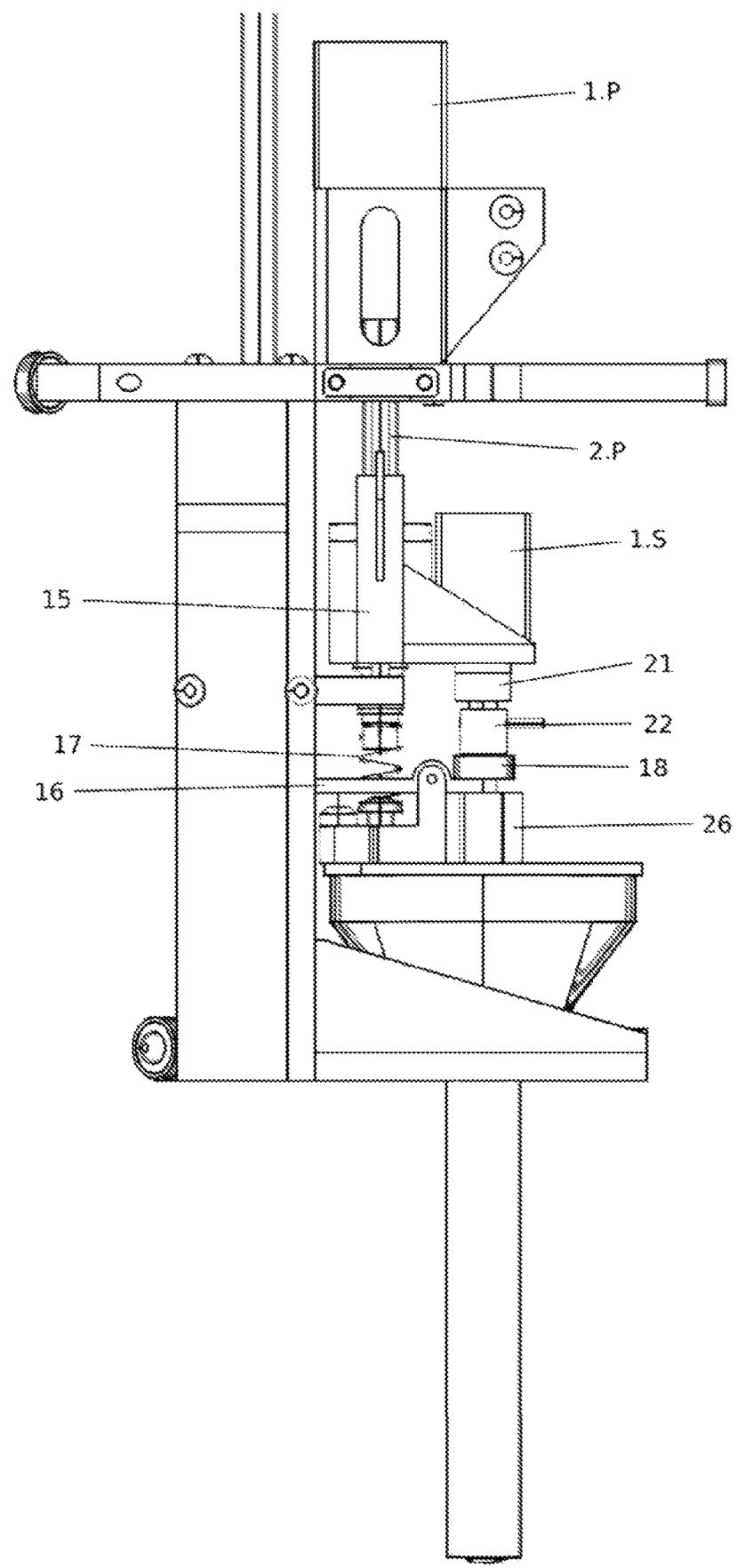
Fig.4.3

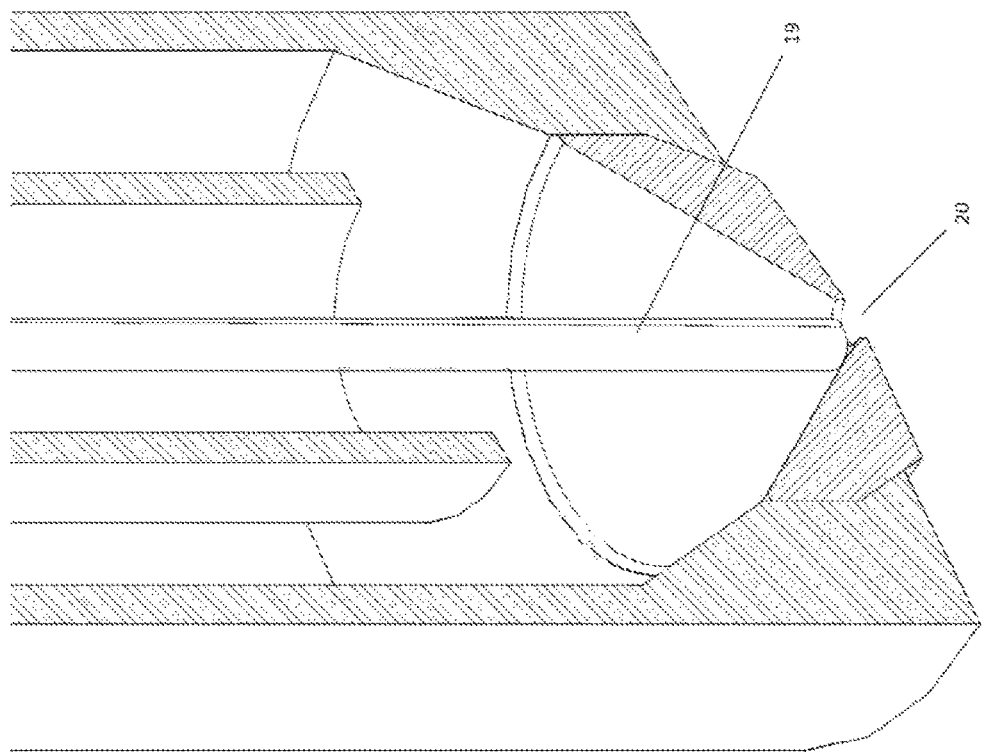
Fig. 5.1
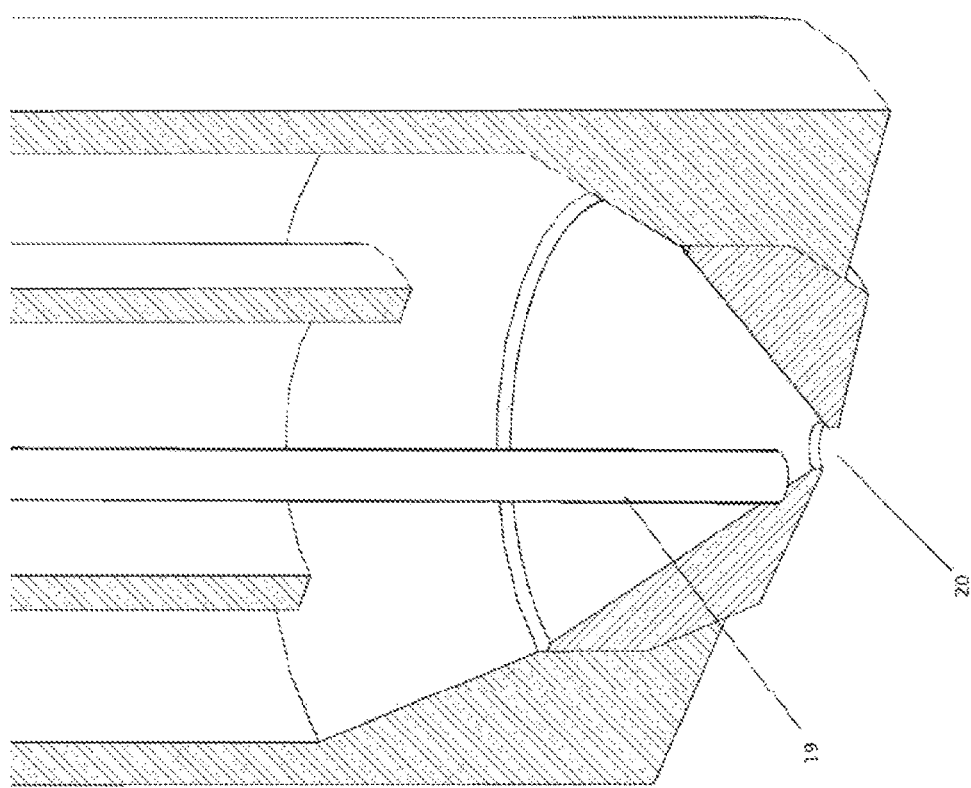
Fig. 5.2

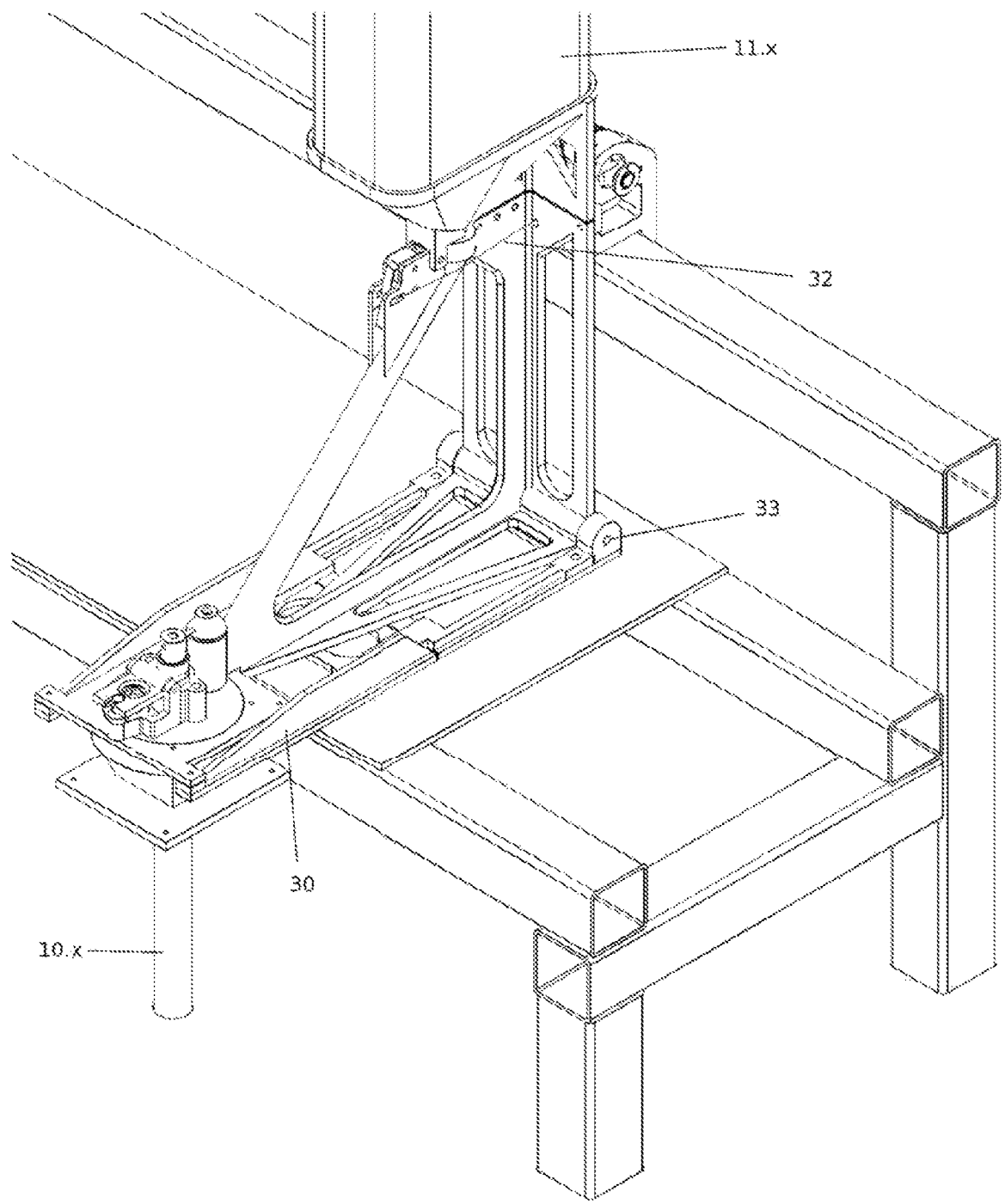
Fig.6.1

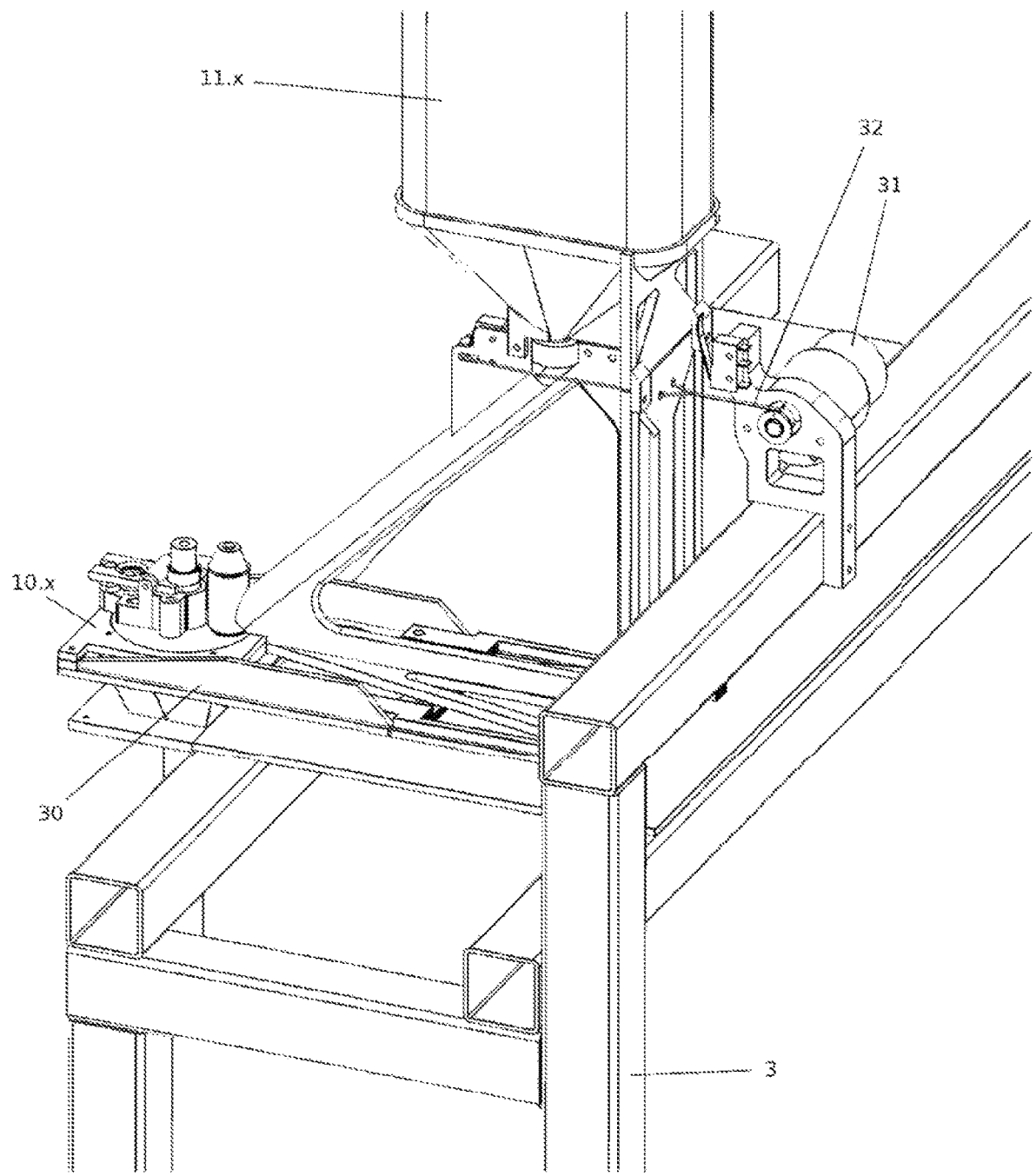
Fig.6.2

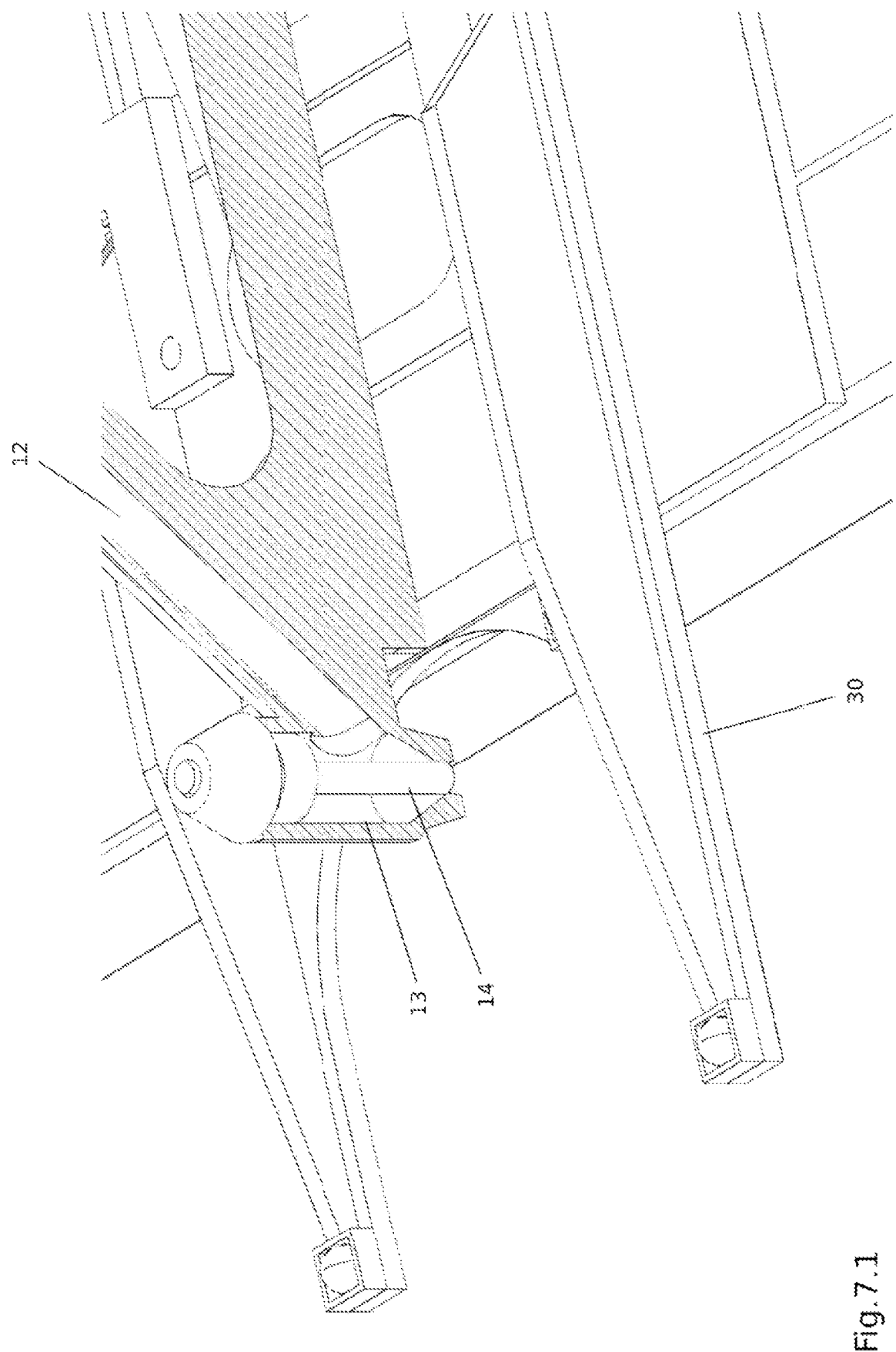
Fig.7.1

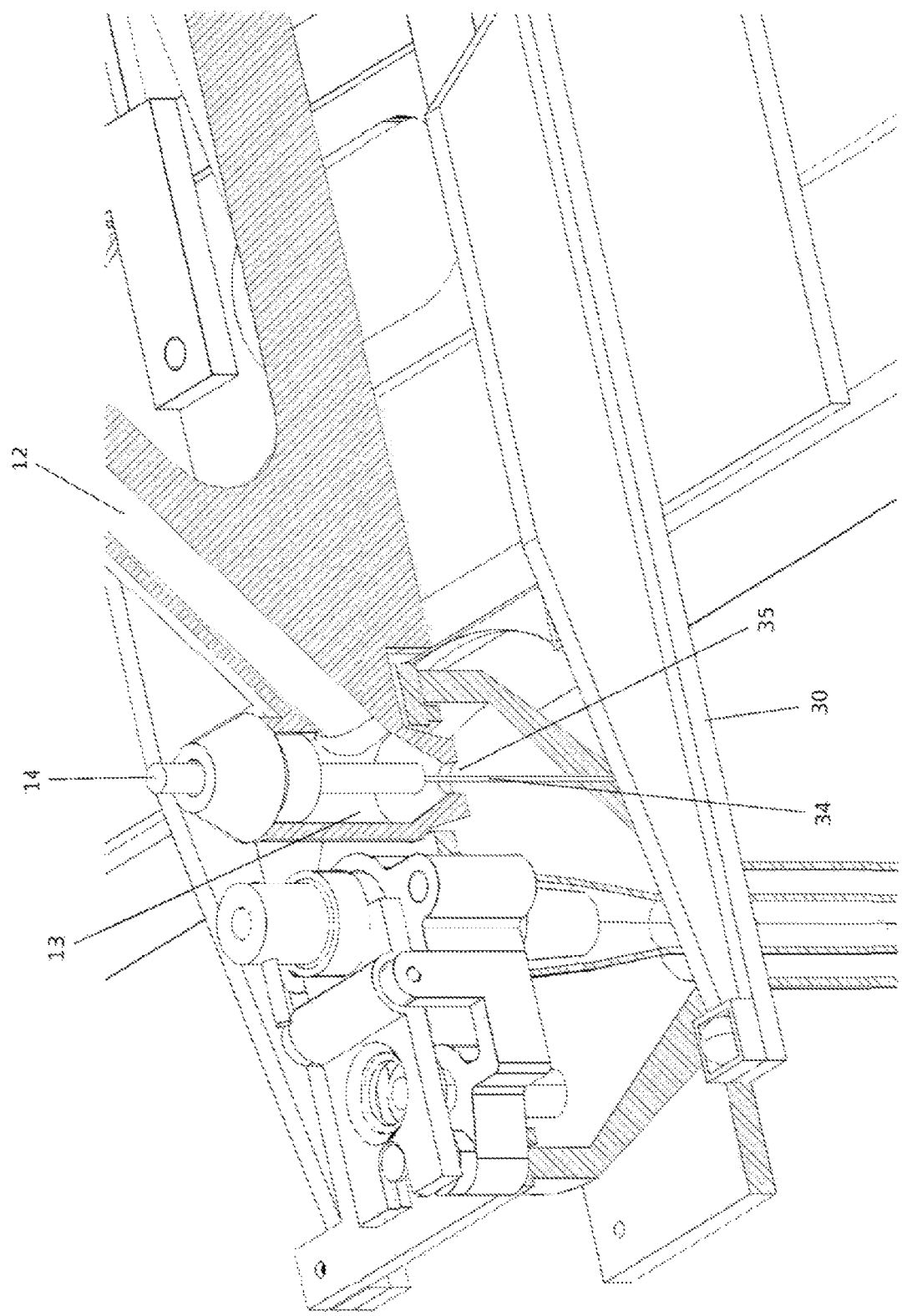
Fig.7.2

3D PRINTER

RELATED APPLICATIONS

This application is a continuation of U.S. patent application Ser. No. 16/504,836, filed Jul. 8, 2019, which is in turn a continuation of U.S. patent application Ser. No. 15/889,664, filed Feb. 6, 2018, now U.S. Pat. No. 10,391,713 issued Aug. 27, 2019, which itself is a continuation of international application PCT/US17/52593 filed on Sep. 20, 2017, which claims benefit of provisional application U.S. Ser. No. 62/397,549, filed on Sep. 21, 2016, all of which are incorporated by reference as if fully set forth herein.

TECHNICAL FIELD

The present invention is in the field of 3D printers for the manufacture of objects.

BACKGROUND ART

Although three-dimensional (3D) printing does currently exist, much of this technology is expensive to use, and the range of materials that are usable in a particular printer are usually quite limited. This creates an encumbrance, especially for those wishing to produce metal parts through 3D printing.

One example is US Published Application No. 2015/0210010, in which liquid or gel substances are deposited and then cured. The use of liquids and gels limits material selection. For example, it is impractical to dispense most metals as liquids because of their high melting temperatures, and tendency to oxidize when molten and exposed to air. Also, US Published Application No. 2002/0145213, discloses the deposition of layers of build powder, and the selective deposition of binder powder interspersed into the build powder. But using this method, it is virtually impossible to get the thorough mixture of bind powder with build powder that is necessary to create a uniform printed object, without porosities. Further, if the build and binder powders are similar, the unbound build powder may tend to sinter together at the temperatures necessary to activate the bind powder, causing great difficulty in freeing the printed object from the surrounding sintered powder. But if the bind powder and build powder are dissimilar, the different material qualities can cause undesirable properties in the resultant 3D printed object. Both of these references appear to disclose systems in which a curing operation is required after the deposition of each layer, a step that prolongs the process and adds to the complexity and expense of the required machinery.

SUMMARY

In a first separate aspect, the present invention may take the form of a method for forming an object having a three-dimensional target shape, that makes use of a build powder, a support powder, and a binder. The build powder is more strongly bound by the binder than is the support powder. The build powder and the support powder are dispensed in a sequence of layers of build powder patterned with support powder that collectively form the three-dimensional shape in build powder, and the binder is applied to layers of build and support powder and permitted to cure, thereby forming the object of build powder and binder. Finally, the support powder is removed from the formed object.

In a second separate aspect, the present invention may take the form of an apparatus for dispensing build powder and support powder, in a sequence of layers, and having a frame and a container. Also, a build powder pourer is at least partially filled with build powder and a support powder pourer at least partially filled with support powder, each of the pourers having a dispensing opening and a dispensing plug, controllably covering the dispensing opening. Further, a pourer-movement and dispensing plug-actuating assembly is supported by the frame over the container and includes a movement element that is selectively attachable to the build powder pourer and alternately to the support powder pourer and also capable to controllably move an attached pourer in three orthogonal dimensions and to control the dispensing plug. In addition, at least one docking station for holding a first one of the pourers, while a second one of the pourers is attached to the movement element; and a computing assembly, including an input for receiving a target three-dimensional shape, controls the pourer-movement and dispensing plug-actuating assembly to move the pourers and selectively open the plugs, thereby causing powder to be poured into the container, and to thereby create in the container a sequence of layers of build powder patterned with support powder that collectively form the target shape in build powder.

In a third separate aspect, the present invention may take the form of an apparatus for dispensing build powder and support powder, in a sequence of layers, and having a frame and a container. Also, a first build powder pourer and a second build powder pourer, both at least partially filled with build powder and a support powder pourer at least partially filled with support powder, each of the pourers having a dispensing opening and a dispensing plug, controllably covering the dispensing opening. Further, a pourer-movement and dispensing plug-actuating assembly is supported by the frame over the container and includes a movement element that is selectively attachable alternately to the first build powder pourer, the second build powder pourer and to the support powder pourer and also capable to controllably move an attached pourer in three orthogonal dimensions and to control the dispensing plug. In addition, at least one docking station for holding a first one of the pourers, while a second one of the pourers is attached to the movement element; and a computing assembly, including an input for receiving a target three-dimensional shape, controls the pourer-movement and dispensing plug-actuating assembly to move the pourers and selectively open the plugs, thereby causing powder to be poured into the container, and to thereby create in the container a sequence of layers of build powder patterned with support powder that collectively form the target shape in build powder.

BRIEF DESCRIPTION OF THE DRAWINGS

FIGS. 1.1, 1.2 and 1.3 are perspective views of a 3D printer according to one embodiment of the present invention, as viewed from three different angles.

FIGS. 2.1, 2.2 and 2.3 are detail views of a 3D printer fork, which is a component of the 3D printer of FIG. 1.1.

FIGS. 3.1, 3.2, and 3.3 are detail views of a 3D printer pourer, which is a component of the printer of FIG. 1.1, as viewed from three different angles.

FIGS. 3.4 and 3.5 are cross-sectional detail views of the 3D printer pourer of FIG. 3.1.

FIGS. 4.1, 4.2 and 4.3 are detail views of the 3D printer fork assembly of FIG. 2.1 holding the pourer of FIG. 3.1.

FIG. 5.1 is a cross-sectional view of the 3D printer pourer of FIG. 3.1, showing the plug rod in a raised position.

FIG. 5.2 is a cross-sectional view of a 3D printer pourer of FIG. 3.1, showing the plug rod in a raised position.

FIGS. 6.1 and 6.2 are detail views of a 3D printer refill assembly, that forms a part of the 3D printer of FIG. 1.1, as viewed from two different angles.

FIG. 7.1 is a cross-sectional detail view of the 3D printer refill assembly of FIG. 6.1, without a pourer present.

FIG. 7.2 is a cross-sectional detail view of the 3D printer refill assembly of FIG. 6.1, with a pourer present.

BEST MODES OF CARRYING OUT THE INVENTION

Figure 8A:
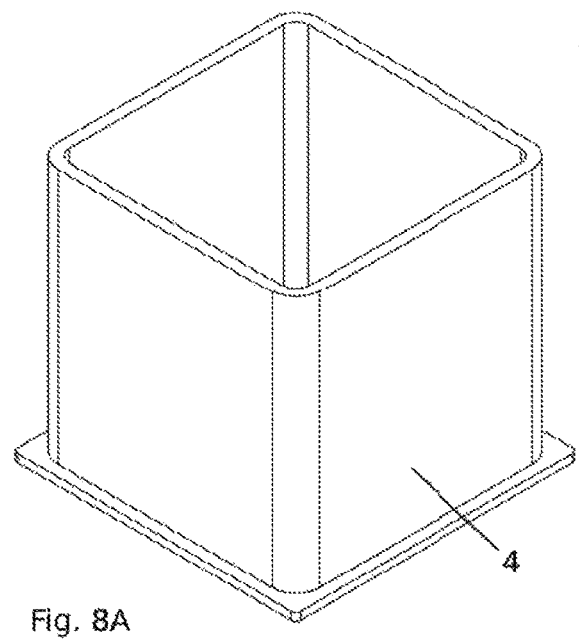
FIG. 8A-8D show the pan in the process of being filled and covered, prior to being placed into a kiln.
Figure 8B:
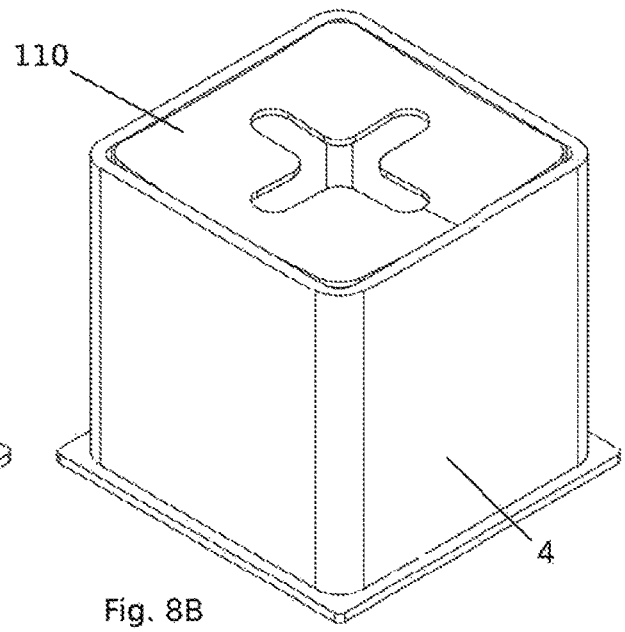
Figure 8C:
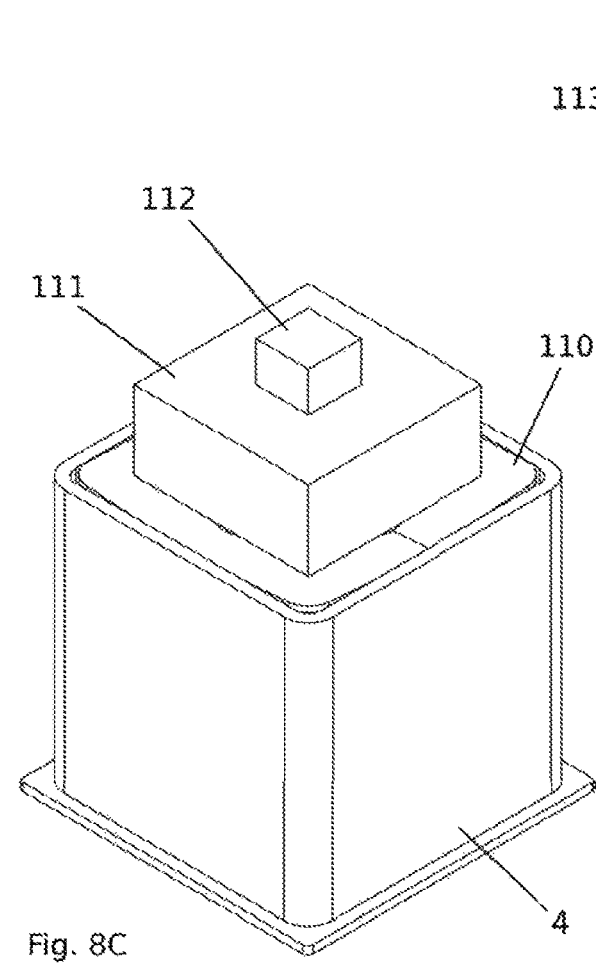
Figure 8D:
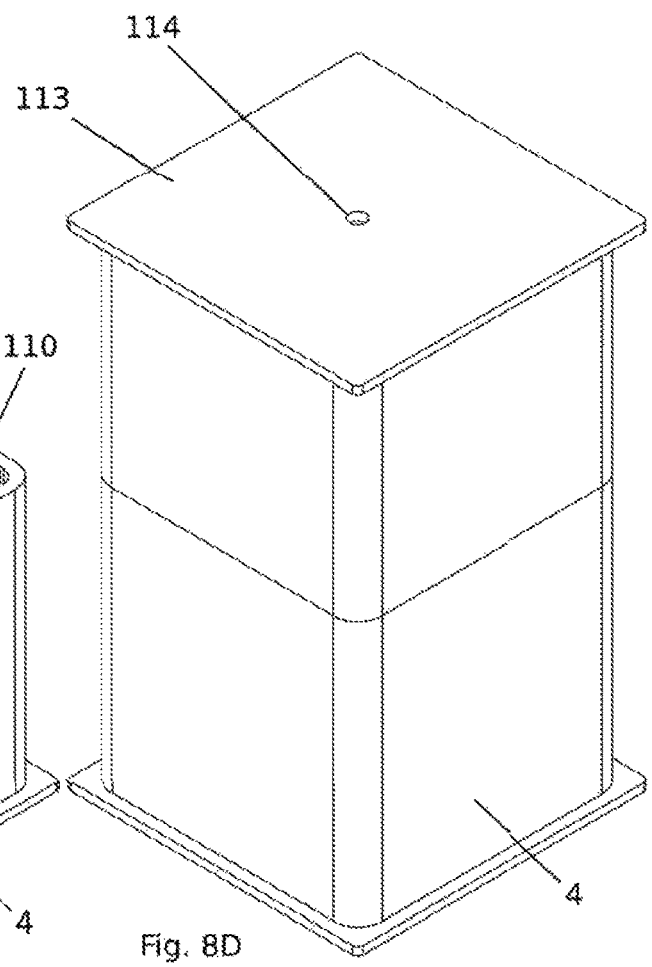
Figure 9A:
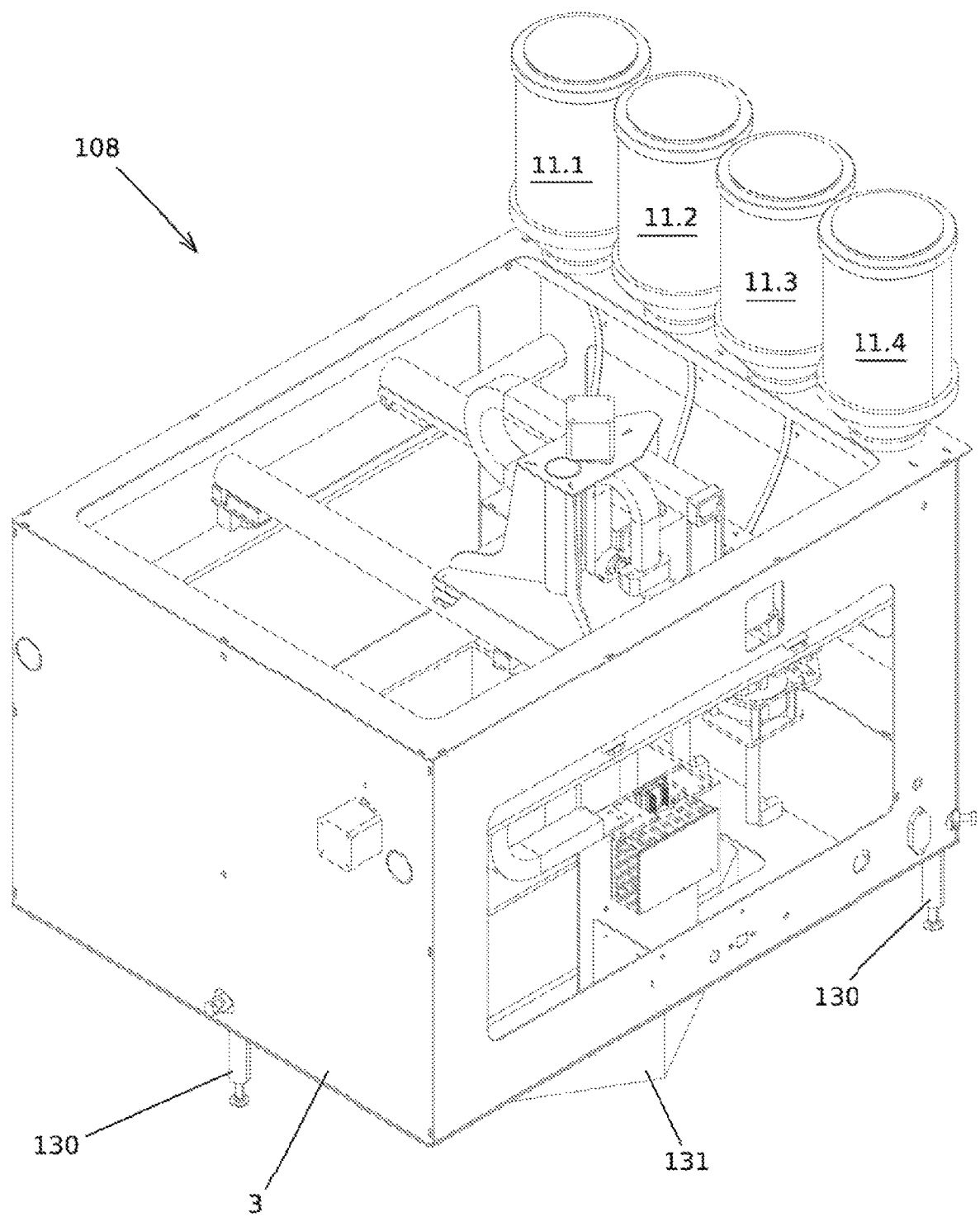
FIG. 9A is a front-top-side isometric view of an alternative embodiment of a 3D printer.
Figure 9B:
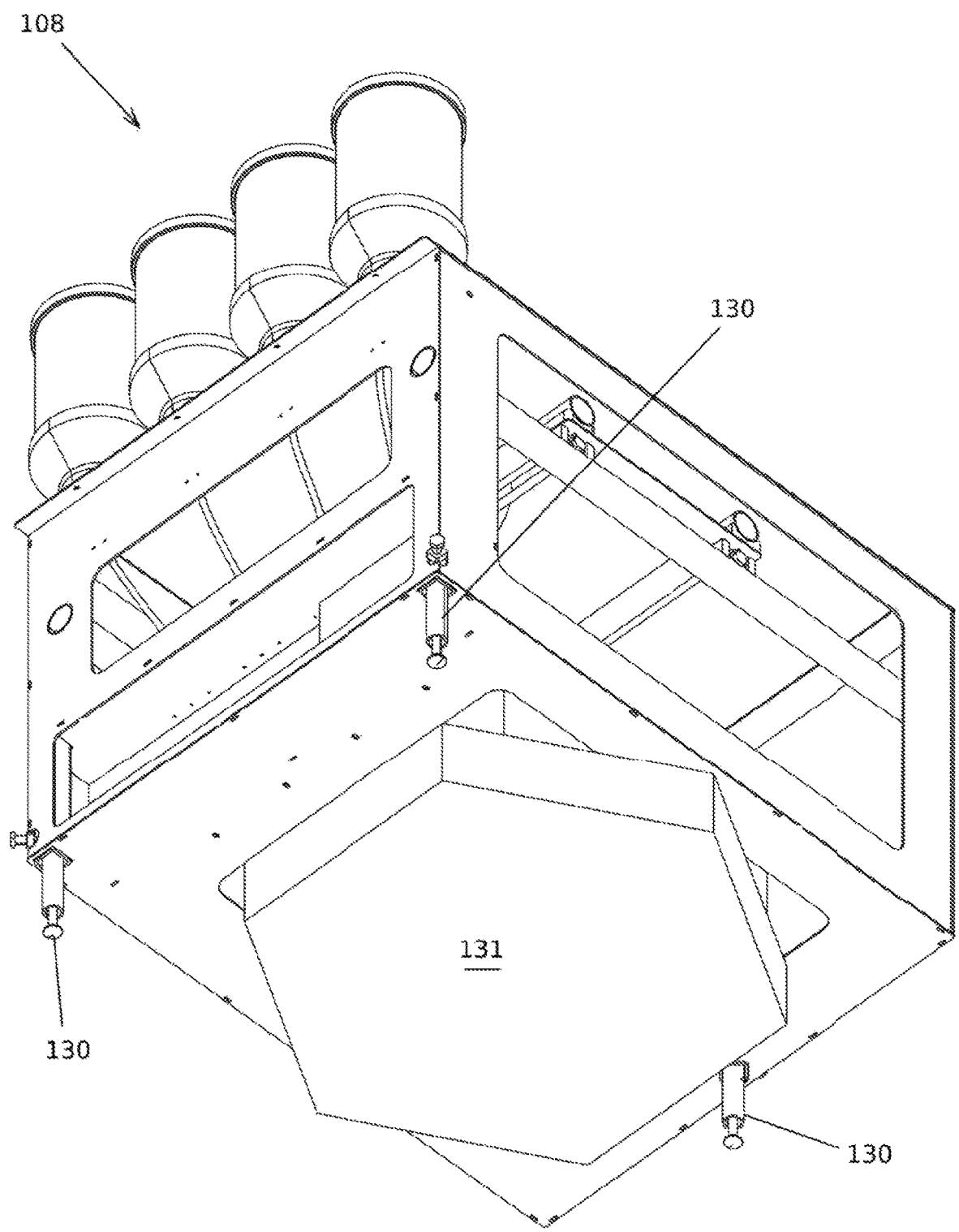
FIG. 9B is a front-bottom-side isometric view of the 3D printer of FIG. 9A.

Definition: the term, "metal" is used in this application, encompasses metal alloys.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Note: where there are a set of like elements, labelled N.1-N.4 (where N is an integer), an arbitrary one of these will be labelled, for example N, where it does not matter which one of N.1-N.4 is being referred to. For example, if an arbitrary one of pourers 10.1-10.4 is being referred to, it will be referenced by "10".

Figure 10A:
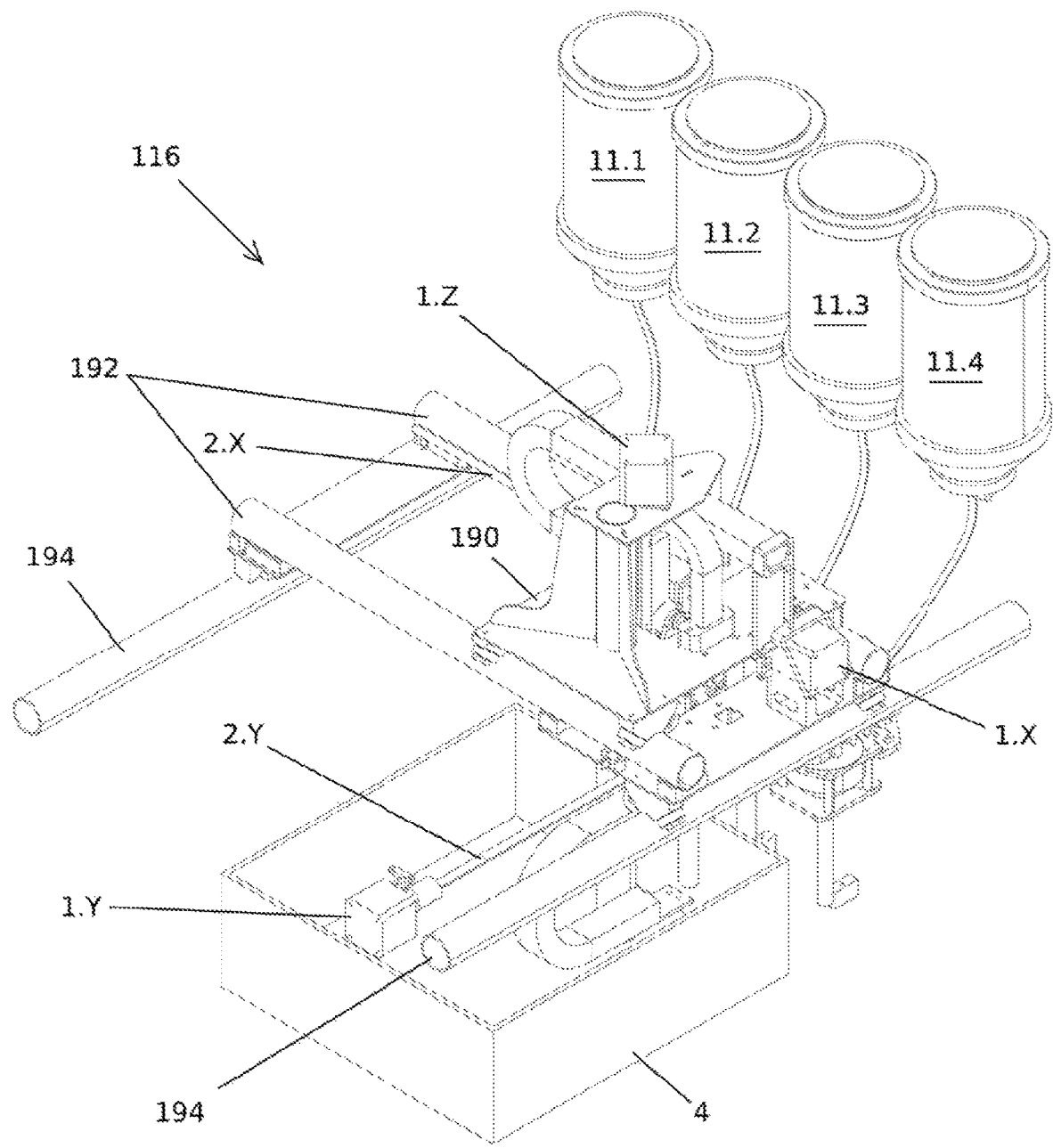
FIG. 10A is a front-top-side isometric view of the printer of FIG. 9A, with frame elements removed to provide a clearer view of the inner workings.

FIGS. 1.1, 1.2 and 1.3 show a 3D printer from various angles. The 3D printer 8 is made up primarily of a pan 4 (also referred to as a container), a set of pourers 10.1-10.4, each of which is associated with a docking station 30.1-30.4, where the pourer 10 can be refilled by an associated refill tank 11. Also, a rigid frame 3 supports the docking stations 30.1-30.4 and a pourer movement assembly 116 (FIG. 10A). Assembly 116 includes a fork assembly 5 (which may also be referred to as a "movement element") that attaches to a selected pourer 10, removes pourer 10 from a docking station 30, and moves pourer 10 through a pattern as fork assembly 5 actuates pourer 10, to selectively dispense powder (by way of pourer plug rod 19, discussed below). When present on assembly 5, pourer 10 rests on fork 6. Accordingly, pourer-movement assembly 116, may also be termed a pourer-movement and dispensing plug-actuating assembly 116.

The 3D printer uses a build powder and a support powder to build up 3D objects in the pan 4, layer by layer. Each layer consists of a region or multiple regions filled with build powder while the rest of the pan area in that layer is filled with support powder. In one embodiment, some part of a region might be skipped during pouring of a layer and filled later when pouring a layer above it, to increase the speed of the pouring process. After all layers have been poured, the build powder is bound by a binder, resulting in a 3D object, which is then separated from the support powder.

The powders may be made from any appropriate material, provided that the following requirements are met:
1. Build and support powders are pourable, or at least arrangeable into a desired pattern by an appropriate mechanism.
2. Build powder is strongly bindable by the binder.
3. Support powder is far less strongly bindable by the binder that is the build powder.
4. Build and support powders remain mostly in solid particulate form during the process, to prevent shape distortion.

It is also important that the ambient gas is chosen appropriately to facilitate the above requirements. For example, if oxidation would negatively impact bindability of the build powder by the binder, the ambient gas should be selected to prevent oxidation. For example, in some embodiments the ambient gas is argon. In these embodiments the mechanism is enclosed in an air-tight chamber. In an alternative embodiment a substance that binds with oxygen, such as carbon in the form of coke, is put in the pan 4 before it is heated.

In a preferred embodiment, iron powder is used as the build powder, silicon dioxide powder is used as the support powder, and molten iron-carbon alloy with high carbon content is used as a binder. Iron-carbon alloys of varying carbon content may be used, although a carbon content of 4.3% has the advantage of having the lowest melting temperature—about 1147 degrees Celsius. This alloy is commonly available as "Pig Iron," and is henceforth referred to simply as "Pig" in this text. In this embodiment, the powders are poured in such a way that the top layer has exposed build powder.

After the 3D pattern of iron powder and $SiO_2$ powder has been created, a separator 110, having a through-hole is placed over the powder and a piece of Pig and a piece of carbon, such as coke, are placed on the separator, in such manner to avoid deforming the build powder shape. The pig should cover the hole in the separator 110, which should be above the surface of exposed build powder, to avoid $SiO_2$ powder blocking the flow of molten pig. The pan 4 is then filled the rest of the way with $SiO_2$ powder (in some methods, sand). The piece of carbon is needed to convert oxygen into carbon monoxide when heated, to prevent oxidation of the iron. The pan 4 is closed with a lid, transferred to a kiln, and heated. The kiln temperature is chosen to be above the melting temperature of Pig but below the melting temperature of the iron powder. When the temperature gets high enough, the Pig melts and soaks through the iron powder by capillary action, but the Pig does not soak the silicon dioxide powder, which resists wetting by molten iron. The pan is held at that temperature for a certain length of time, referred to as the hold time. During the hold time, the carbon atoms of the molten Pig diffuse into the particles of the iron powder, thus equalizing the carbon content. Longer hold times result in a better diffusion. After the pan is cooled down, the printed object is separated from the support powder and the remains of the Pig are cut off. Preferably, the printed object is designed such that it has an additional narrow neck at the top and a flat pad above it, such that the molten Pig would soak the object through the pad and the neck, making it easier to cut or break the neck separating the object from the pad and the remains of the Pig. The resulting material of the printed object is carbon steel. Further post-processing and heat treatment can be used to achieve desired properties and dimensions.

In another embodiment, the build powder is copper powder, the support powder is silicon dioxide, and the binder is copper-silver alloy.

In additional embodiments, instead of using a molten material as the binder, a chemical process is used to bind the particles of the build powder.

In one embodiment, the build powder is cement, the support powder is silicon dioxide, and the binder is water, which soaks the cement and causes binding.

In another embodiment, an epoxy is used as the binder. The build powder is a polymer such as, for example, Polytetrafluoroethylene (PTFE), Polyether ether ketone (PEEK), Nylon, Acrylonitrile Butadiene Styrene (ABS), Polylactic Acid (PLA), Polyoxymethylene (POM), Polycarbonate (PC), Polyvinyl Chloride (PVC), Polyethylene terephthalate (PET), Polyethylene (PE), Polypropylene (PP), Polystyrene (PS), Poly(methyl methacrylate) (PMMA), Polybenzimidazole(PBI), Polyethersulfone (PES), Polyetherimide (PEI), Polyphenylene oxide (PPO), or Polyphenylene sulfide (PPS), and the support powder is another polymer from the same list. The polymer used for support powder is non-wettable by the epoxy; the polymer used for build powder is wettable by the epoxy.

In another embodiment, a glue is used as the binder instead of epoxy. The glue can be either chemical or thermal.

In another embodiment, heat is used to bind the particles of the build powder. The build powder is selected to have a glass transition temperature that is lower than the glass transition temperature of the support powder. The temperature used for binding is chosen to be above the glass transition temperature of the build powder and sufficient to strongly bind the build powder particles together, but not high enough to strongly bind the support powder particles, so that the support can be separated from the object without breaking it. The temperature selected should be below the melting point of either of the two powders to prevent shape distortion.

In another embodiment, multiple build powders of different colors are used to create colorful objects.

Referring again to FIGS. 1.1, 1.2 and 1.3, a pourer-movement assembly 116 includes stepper motors 1.X, 1.Y, 1.Z, which rotate lead screws 2.X, 2.Y, 2.Z to move the fork assembly 5, holding a pourer 10, in three dimensions along the X, Y and Z axes, respectively.

FIGS. 2.1, 2.2 and 2.3 show details of the fork assembly 5. The fork assembly 5 can hold any one of the four pourers 10, which are identical insofar as the portions that contact the fork assembly 5.

FIGS. 3.1, 3.2, 3.3, 3.4 and 3.5 show details of a pourer 10.

FIGS. 4.1, 4.2 and 4.3 show the fork assembly 5 (which may also be referred to as a movement element, as it holds and moves a pourer 10).

Referring now to FIGS. 2.1 to 2.3, fork assembly 5 has a pour plug actuating stepper motor 1.P that rotates lead screw 2.P and moves a pourer control carriage 15, vertically. As carriage 15 moves down, referring now to 3.1, which shows the top of a pourer 10, which for purposes of this discussion is engaged with fork assembly 5, it pushes and tilts seesaw 16 via spring 17 (FIG. 2.3). As seesaw 16 tilts it pushes ball bearing 18 up, thus lifting pourer plug rod 19 (FIG. 3.4), so that the end of rod 19 no longer plugs pourer hole 20, thereby permitting powder to flow from hole 20. As the end of plug rod 19 plugs pourer hole 20, this end may be termed a "plug."

Fork assembly 5 also includes plug rod rotating stepper motor 1.S that rotates a claw 21. When carriage 15 is lowered, claw 21 engages with and rotates knob 22 (FIG. 3.1). Referring to FIG. 3.5, knob 22 is connected via axle 23 and coupler 24 to pourer plug rod 19. Axle 23 is held horizontally by another two ball bearings (not shown) inside bridge 26 but can freely rotate and slide vertically. Spring 25 increases closing force of plug rod 19.

FIGS. 5.1 and 5.2 show that plug rod 19 is slightly bent, so when the rod moves up, the bottom end of the rod also moves sideways, such that when rod 19 rotates it stirs the powder, thus increasing the flow rate and consistency. Rod 19 is also flexible, so when it moves down the slope of the bottom guides its tip to slide to the center of the pourer and into hole 20, sealing the opening.

In one embodiment, there are four pourers: two for support powder and two for build powder. Of the two pourers for each type of powder, one has a smaller hole 20 for higher resolution pouring, and one has a larger hole 20 for faster pouring.

FIGS. 6.1, 6.2, 7.1 and 7.2 show the pourer refill mechanism. Each pourer 10.1-10.4, is refilled from its own refill tank 11.1-11.4, respectively. Refill tank 11.1-11.4 is connected by pipe 12 to injector chamber 13. As shown in detail in FIG. 7.2, the injector chamber has a hole 35 in the bottom, which serves as a refill opening, and which is closed by plug 14, which serves as a refill plug. Geared stepper motor 31 winds and unwinds cable 32 thus tilting refill assembly on hinge 33. As the refill assembly is tilted the injector chamber moves vertically. When a pourer 10.1-10.4 is engaged with its docking station 30.1-30.4, and the injector chamber is lowered, rod 34 of the pourer pushes injector plug rod 14 up, thus opening hole 35 and allowing the powder to flow from the refill tank into the pourer. When the injector chamber is lifted, or pourer 10.1-10.4 is absent, rod 14 moves down closing hole 35.

Figure 17A:
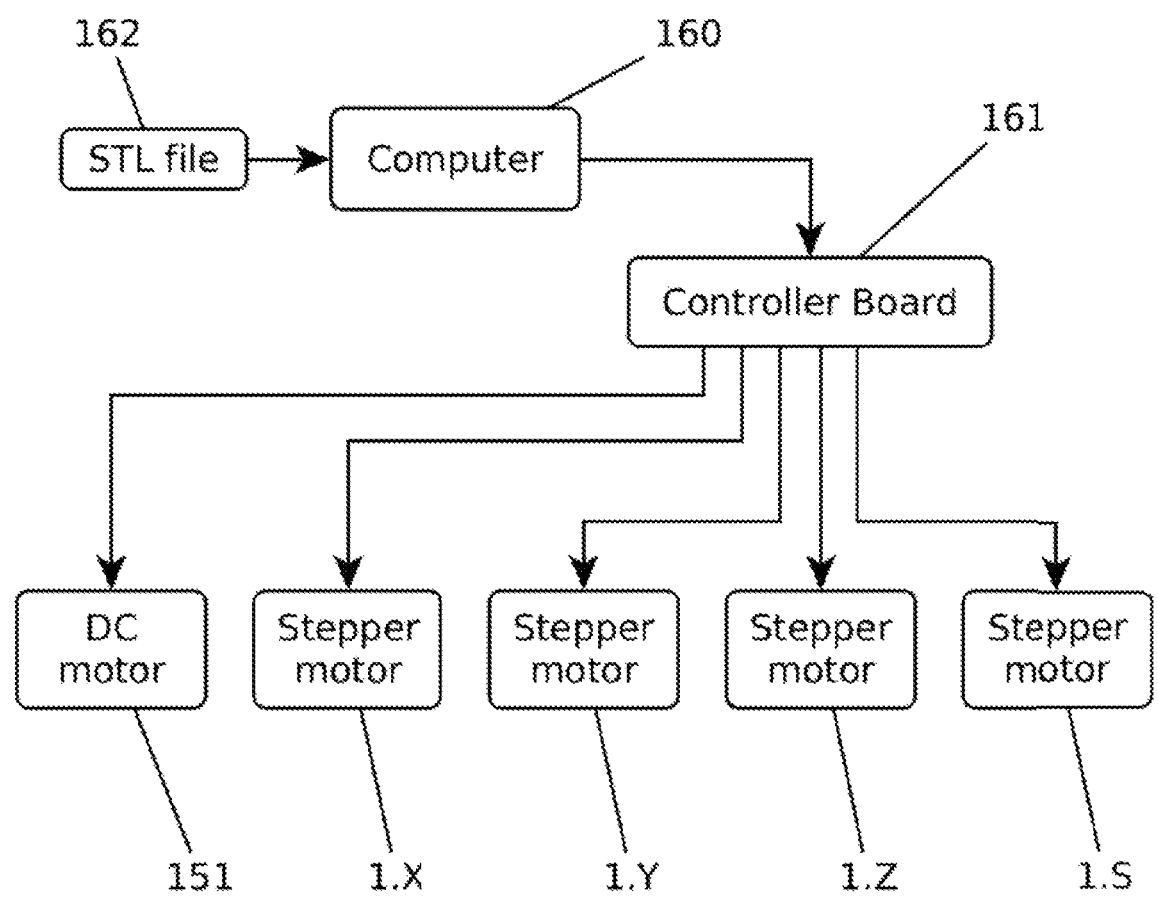
FIG. 17A is a block diagram of the printer of FIG. 9A.

Referring to FIG. 17A, before the printing process begins, a stereolithography (STL) file 162 is loaded into a computer 160, which executes a computer program that loaded from non-transitory computer readable memory, commonly referred to as a slicer program, that translates the STL file into G-code, a form of motion commands that can be understood by a controller board 161. Controller board 161 creates a set of signals that control motors 1.*x*, 1.*y*, 1.*z*, 1.*p* and 151, through the printing process. At the beginning of this process, fork assembly 5 retrieves a desired pourer 10 from the docking station 30 and positions it in the desired location over pan 4. Stepper motor 1.P opens the through-hole 20 (as described above) allowing the powder to flow into the pan. As the powder pours from through-hole 20, stepper motors 1.X and 1.Y are controlled by controller board 161 to move the fork assembly 5 in and X, Y pattern, creating a desired pattern of either build powder or support powder. Then stepper motor 1.P closes hole 20, shutting off the flow of powder, and returns the pourer to the refill docking station 30. Fork assembly 5 then retrieves a different pourer 10, and so on, until the pan is filled as desired.

FIGS. 9A through 16B show an alternative embodiment 108 to that of printer 8. Embodiment 108 includes docking stations 140 and a fork assembly 105 that have some significant differences from docking stations 30 and fork assembly 5. In broad overview, docking stations 140 do not include a motor. Rather, the refilling operation is actuated by a sequence of movements of the fork assembly, as will be explained further, below. Also, fork assembly 105 uses a DC motor 151, rather than the stepper motor 1.*p*, to raise and lower the pourer plug rod 19. In one more difference, printer 108 is equipped with adjustable length legs 130, so that it can be placed over a kiln base 131. In one method of use, printer 108 is lifted away after laying down the build and support powder, and the rest of the kiln is placed on the kiln base 131, to complete the kiln, so that pan 4 and its contents can be heated in place.

Figure 15A:
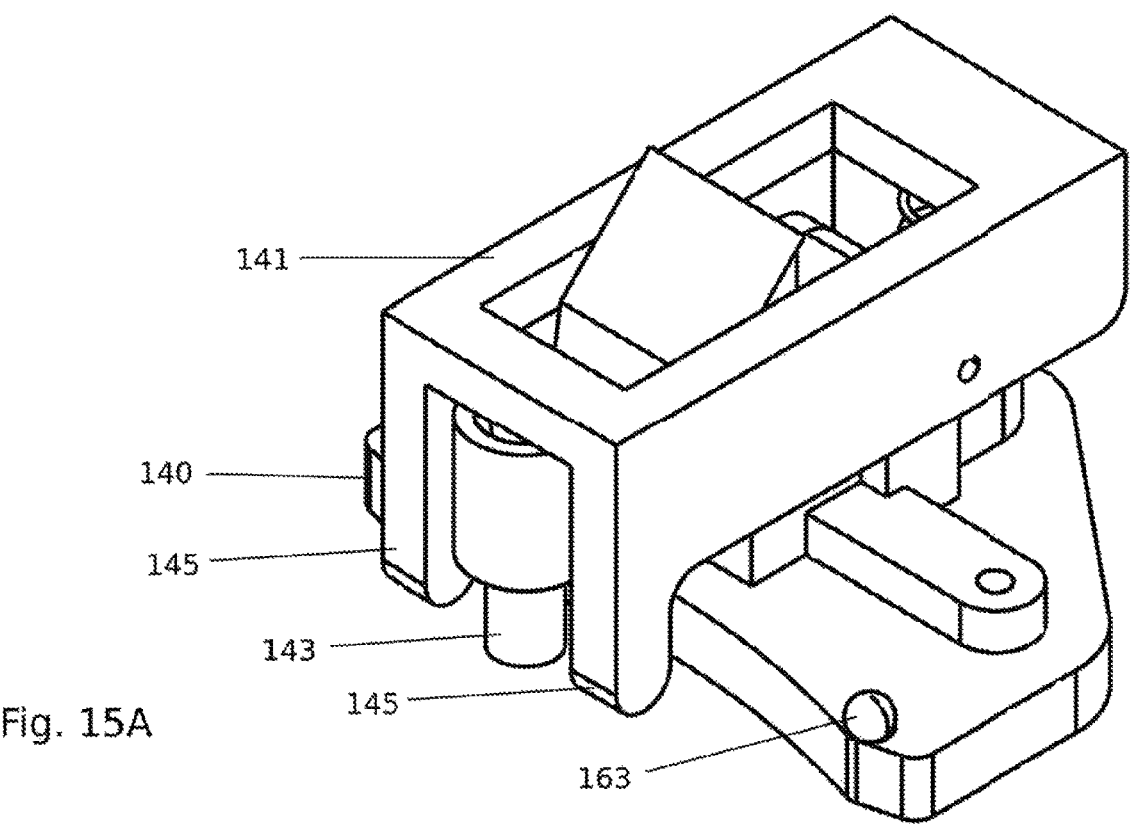
FIG. 15A is an isometric view of a docking station for a pourer, that forms part of the printer of FIG. 9A.
Figure 15B:
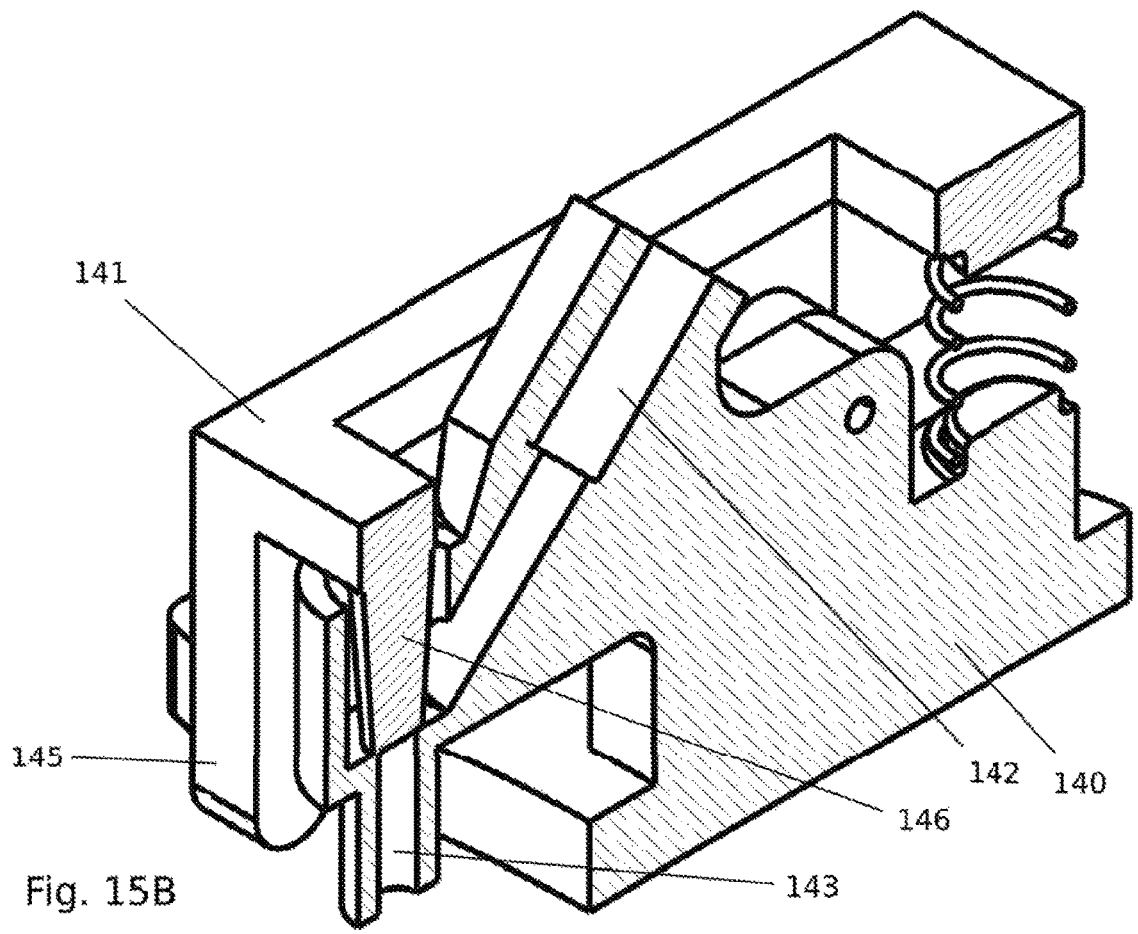
FIG. 15B is a sectional view of the docking station of FIG. 15A.
Figure 16A:
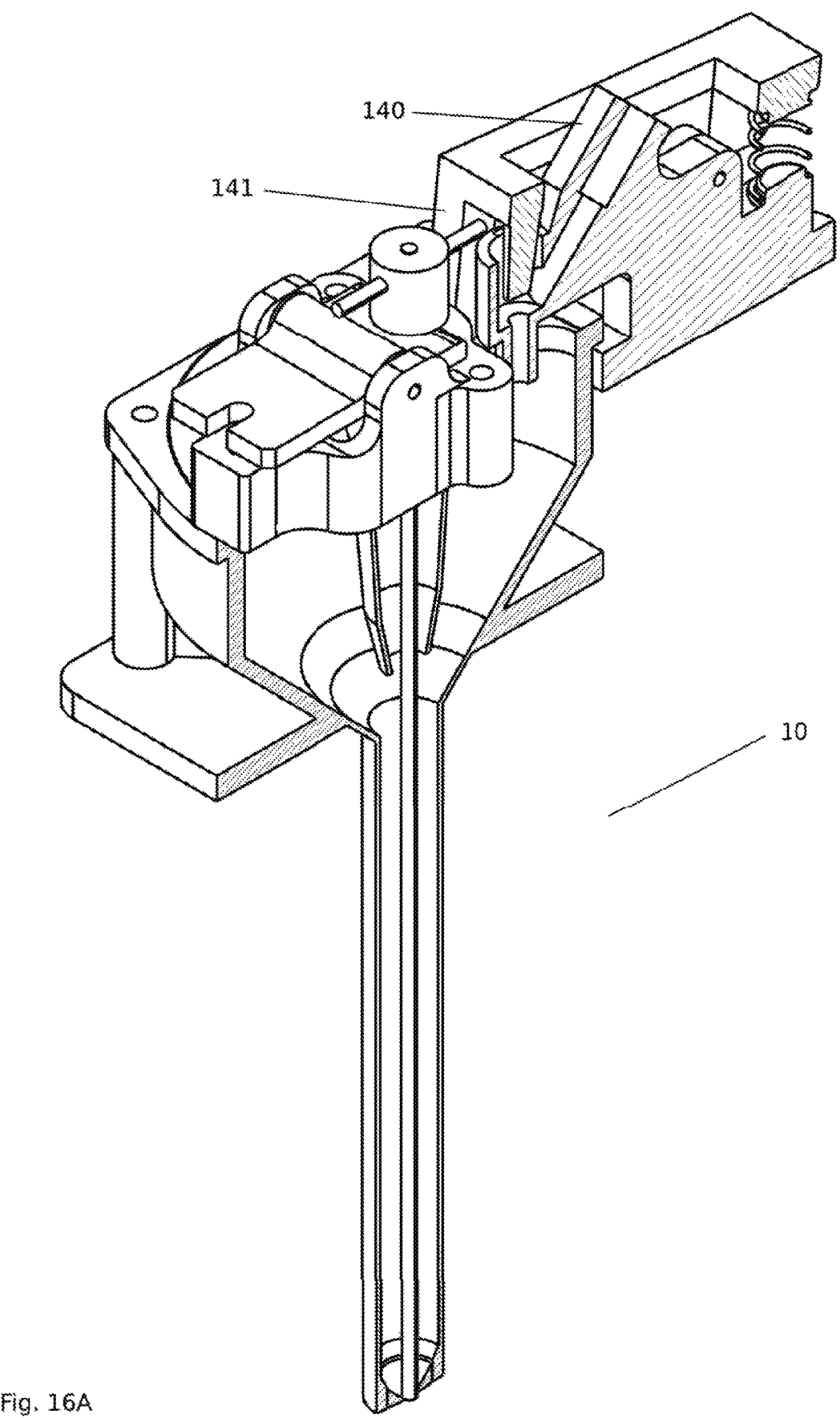
FIG. 16A is an isometric sectional view of a docking station with a pourer attached, that collectively form part of the printer of FIG. 9A.
Figure 16B:
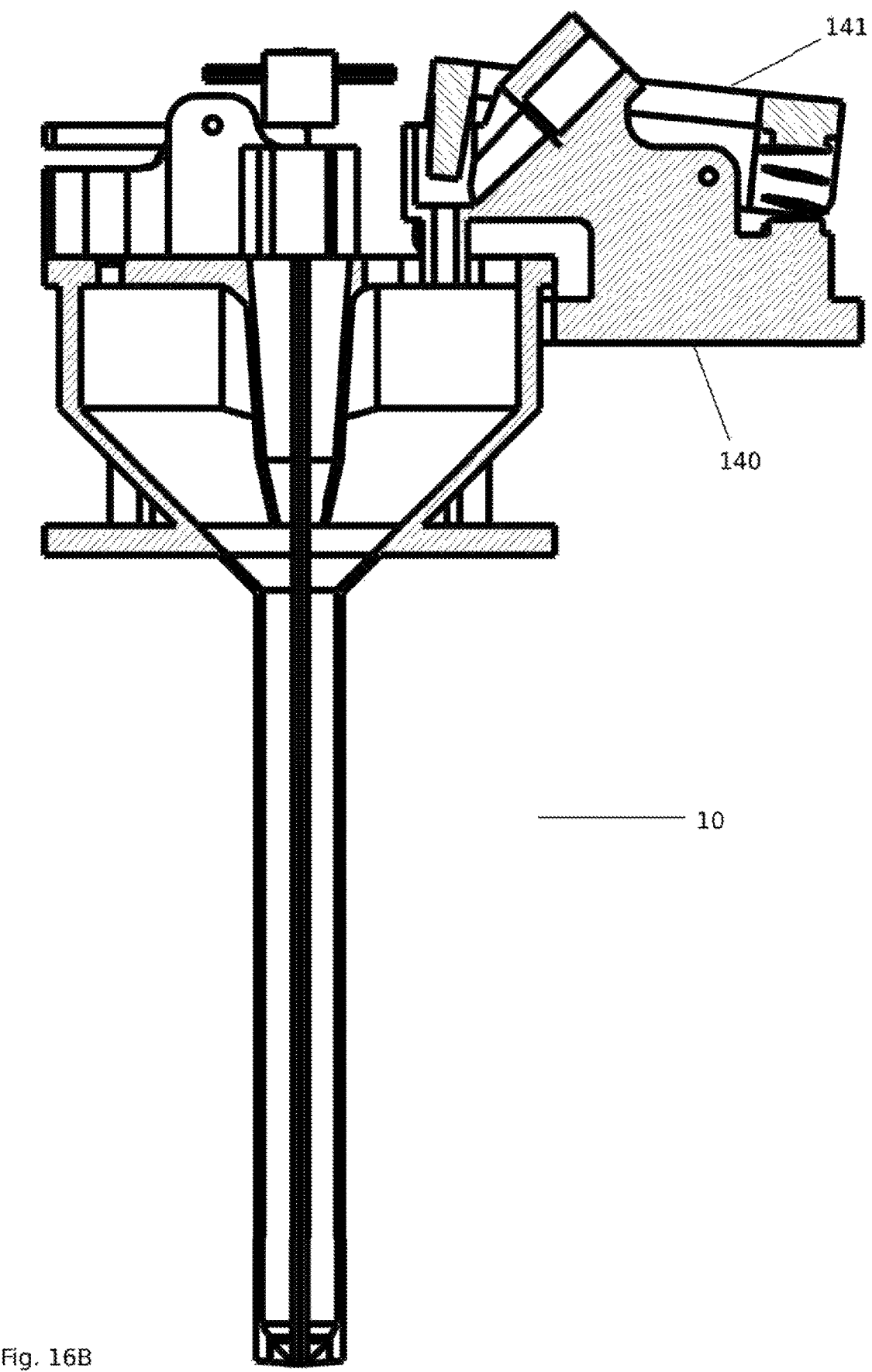
FIG. 16B is a side sectional view of the docking station and pourer of FIG. 16A.

Referring first to FIGS. 15A, 15B and 16A, each docking station 140 defines a powder passageway 142, leading to a powder pour spout 143. Station 140 further includes support balls 163 (only one shown). Additionally, a rocker arm 141, is hinged to station 140, and has a pair of teeth 145 and a plug 146. A spring urges rocker arm 141 into a powder flow blocking position, where plug 146 is interposed between passageway 142 and pour spout 143. When the computer 160 determines that a pourer 10 will be docked, it commands motors 1.*x*, 1.*y* and 1.*z* to move the pourer 10 to a position in which a portion of the top of pourer 10 is directly beneath the teeth 145, and then pushes pourer 10 upwardly to lift teeth 145 and thereby move rocker arm 141 into a powder dispensing position, where plug 146 is lifted from the top of pour spout 143. Pourer is then moved further into contact with docking station 140 so that the lip 148 of the pourer 10 rests on the support balls 163 and teeth 145 contact the top surface of pourer 10, which thereby maintains teeth in a raised position, which maintains plug 146 in positioned that is not plugging pour spout 143. Finally, a pair of indents 170 (FIG. 13C) on the bottom of lip 148 engaged to a pair of support balls 163 (FIG. 15A) to retain it as it is released by fork assembly 105, by lowering fork assembly 105 and moving it away from pourer 10 when pourer 10 no longer rests on it. This design has the advantage of illuminating four electric motors, thereby reducing cost, complexity and potential maintenance expense.

Figure 12A:
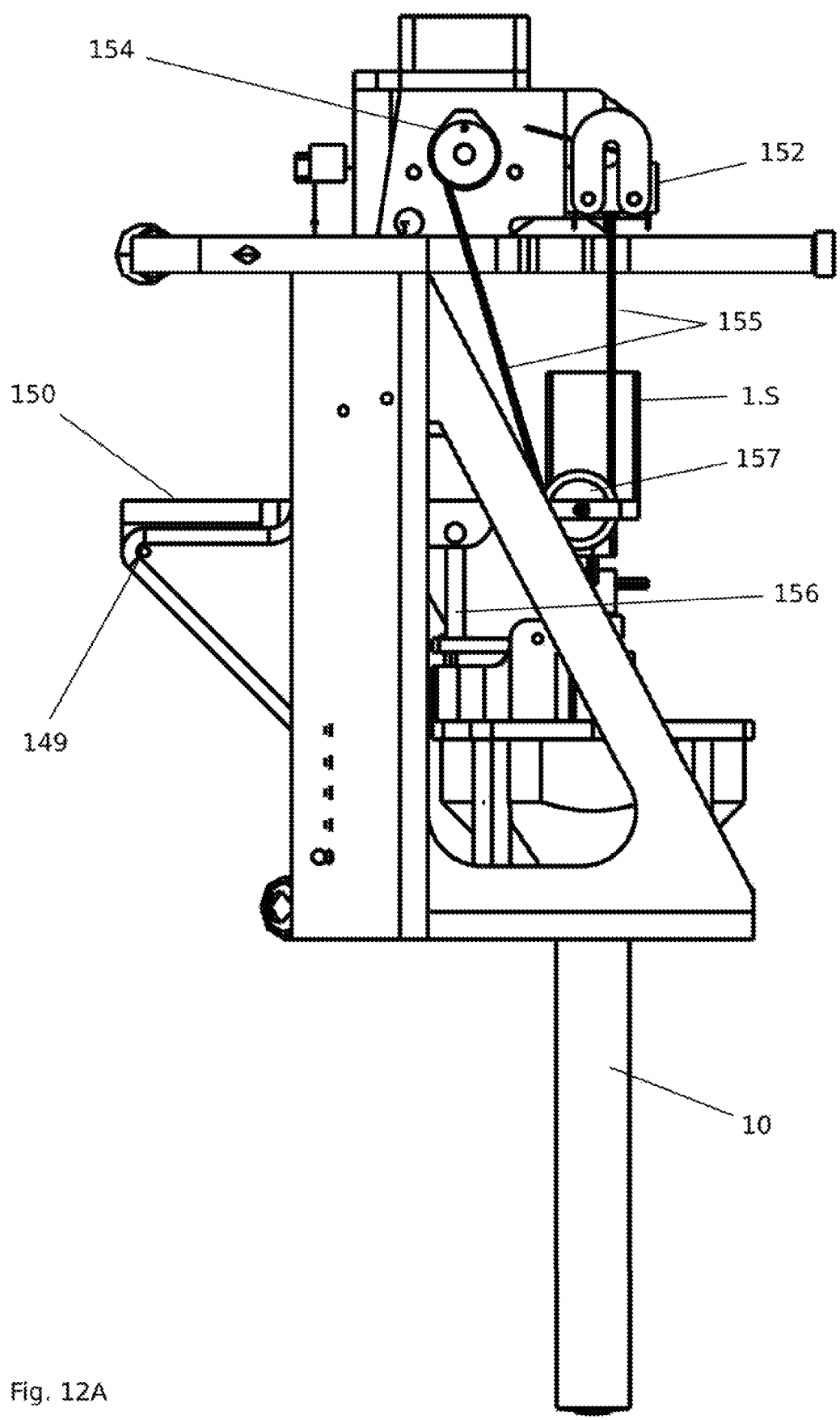
FIG. 12A is a side view of the fork assembly of FIG. 11A and a pourer that forms a part of the printer of FIG. 9A, joined together.
Figure 12B:
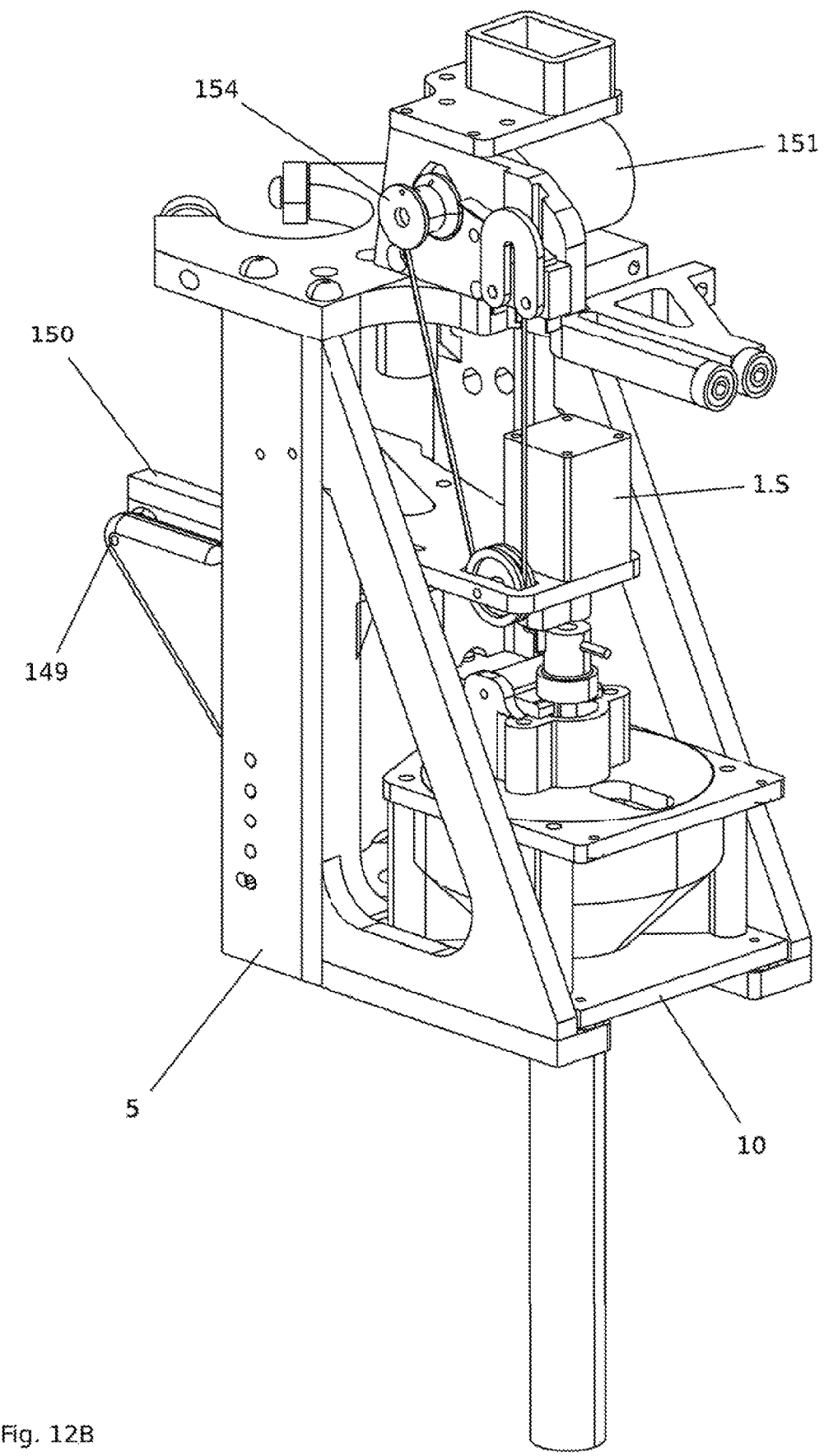
FIG. 12B is a rear-top-side isometric view of the combination of parts shown in FIG. 12A.
Figure 13A:
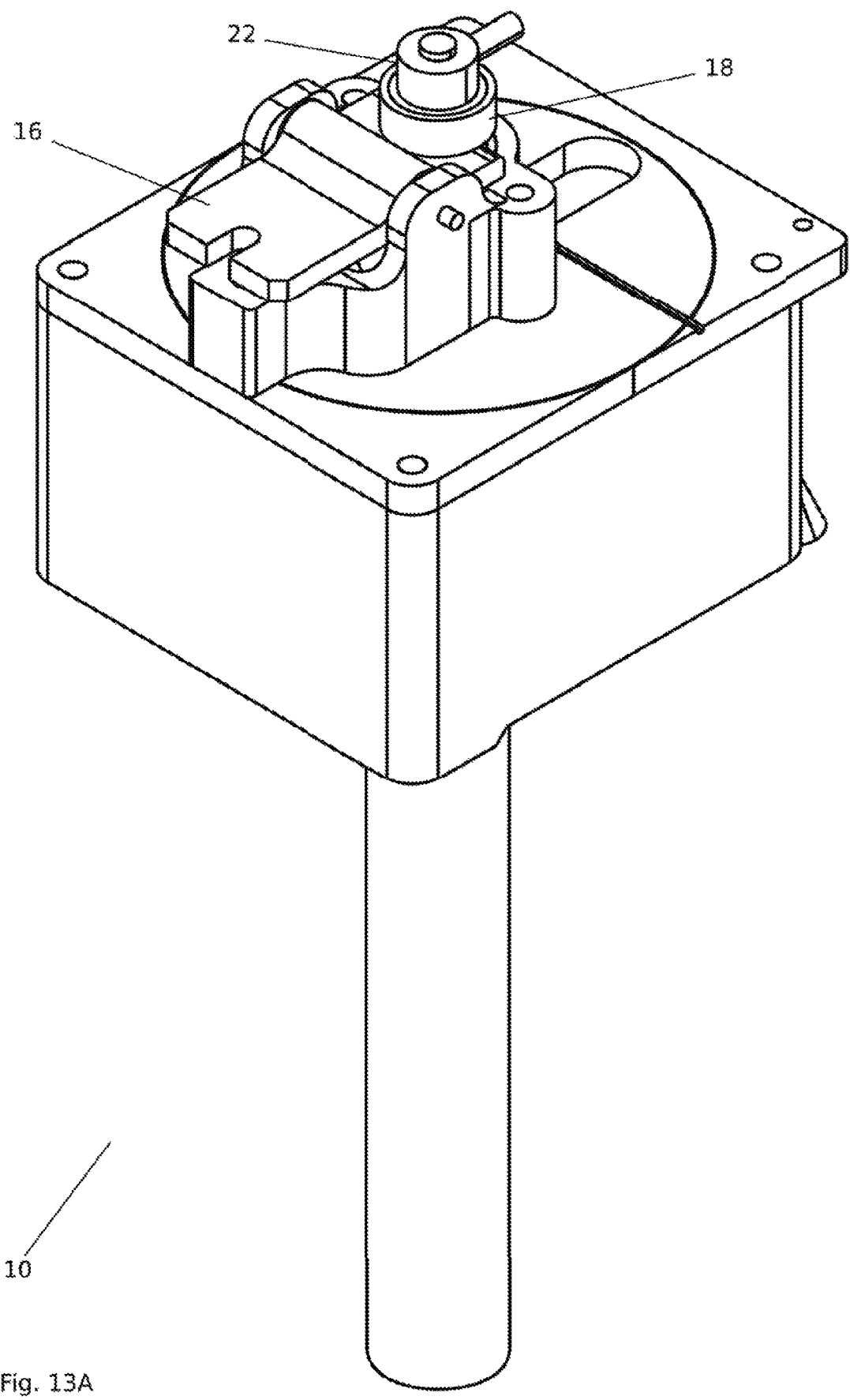
FIG. 13A is a top angle isometric view of a pourer, that forms a part of the printer of 9A.
Figure 13B:
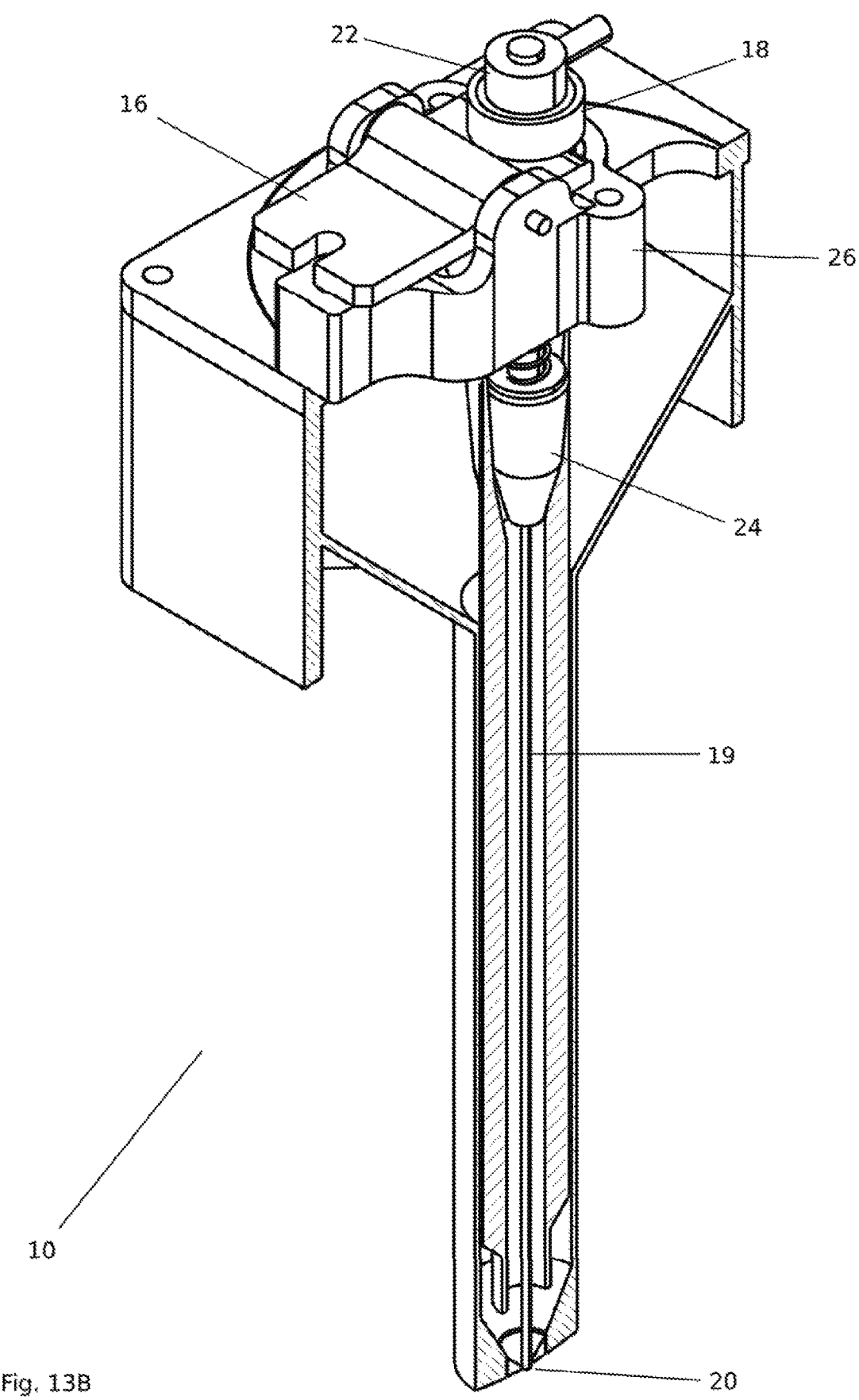
FIG. 13B, is a section view of the pourer of FIG. 13A.
Figure 13C:
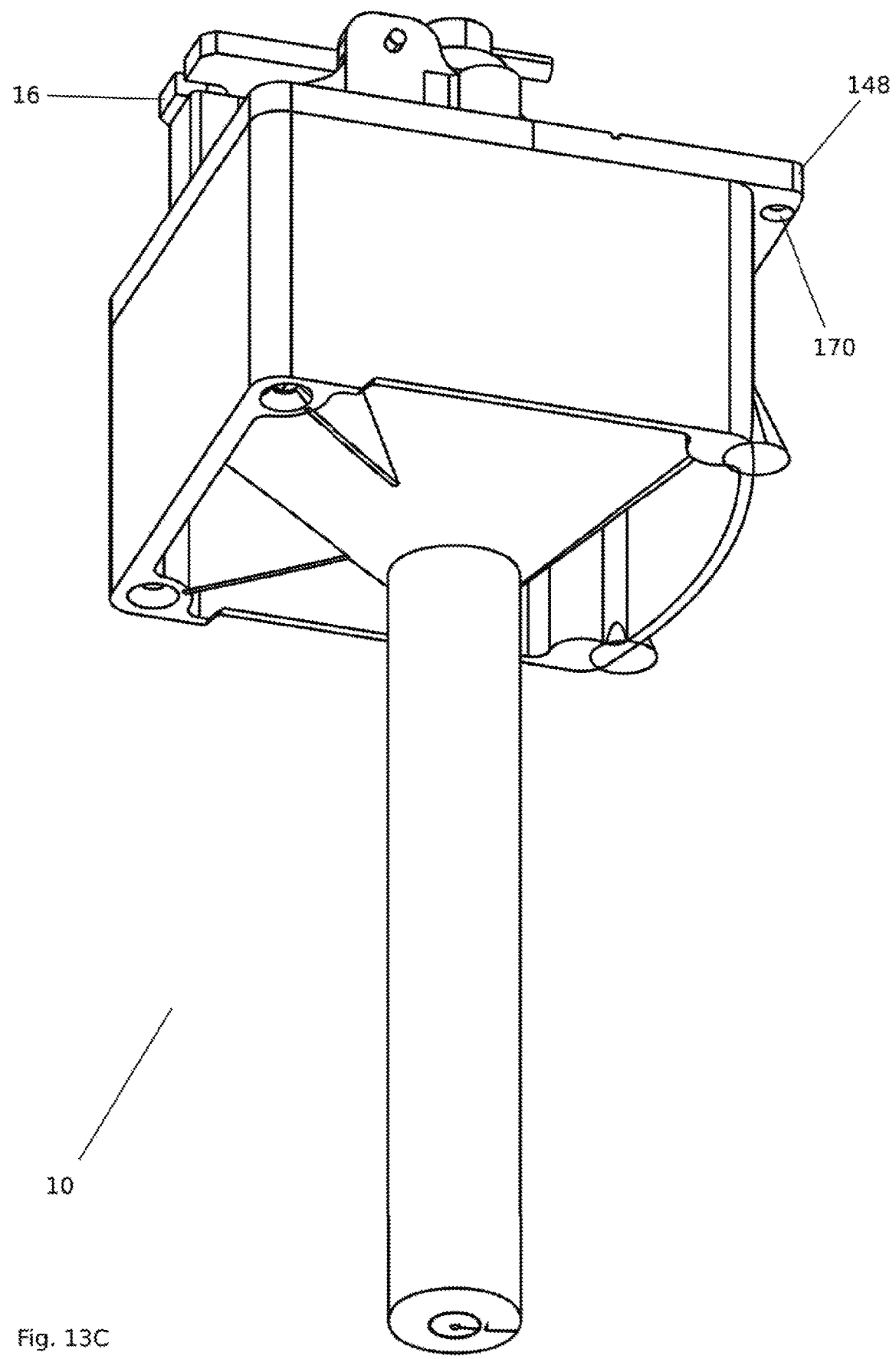
FIG. 13C, is a bottom angle isometric view of the pourer of FIG. 13A.
Figure 14A:
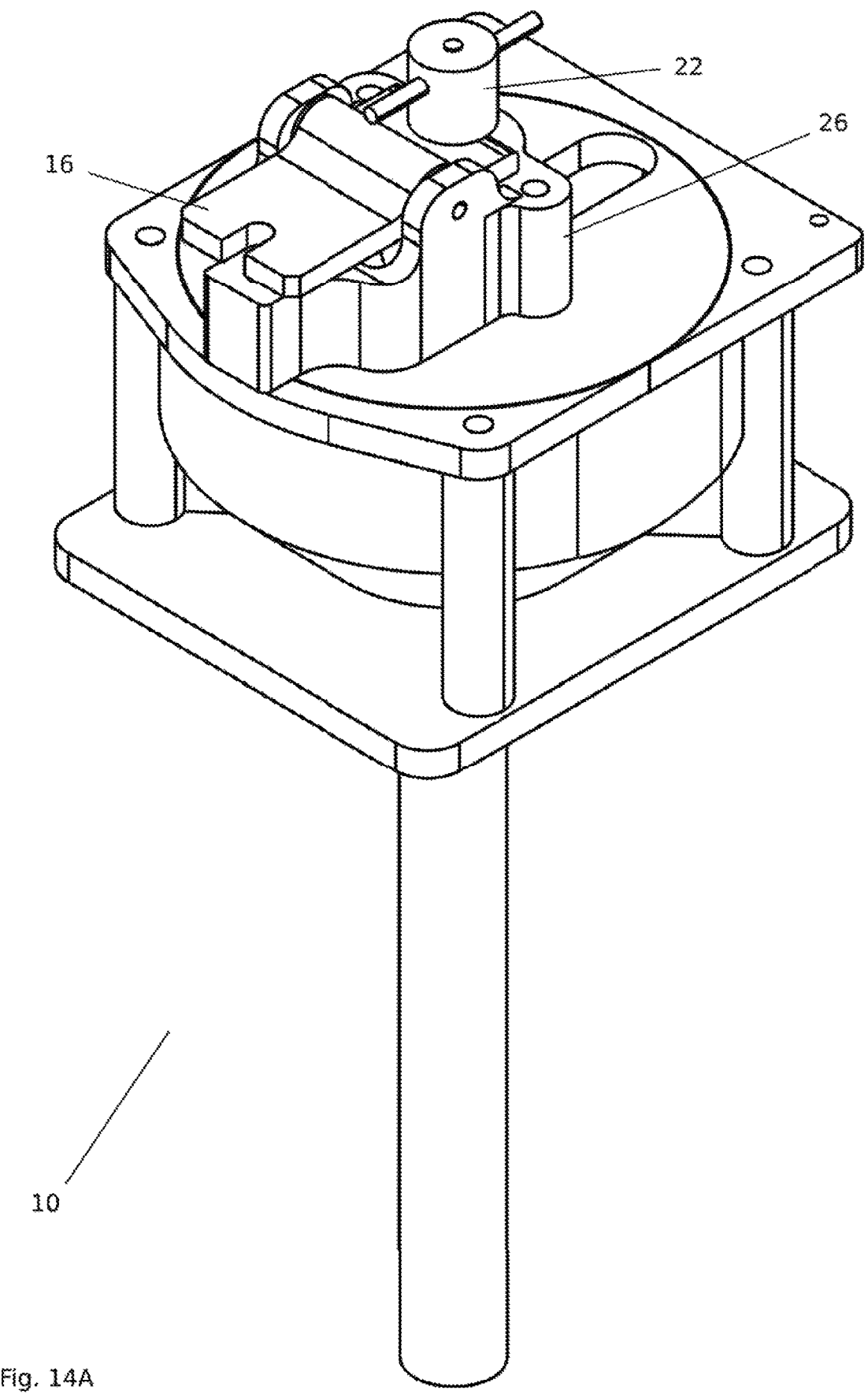
FIG. 14A is a top angle isometric view of an alternative embodiment of a pourer, that forms a part of the printer of 9A.
Figure 14B:
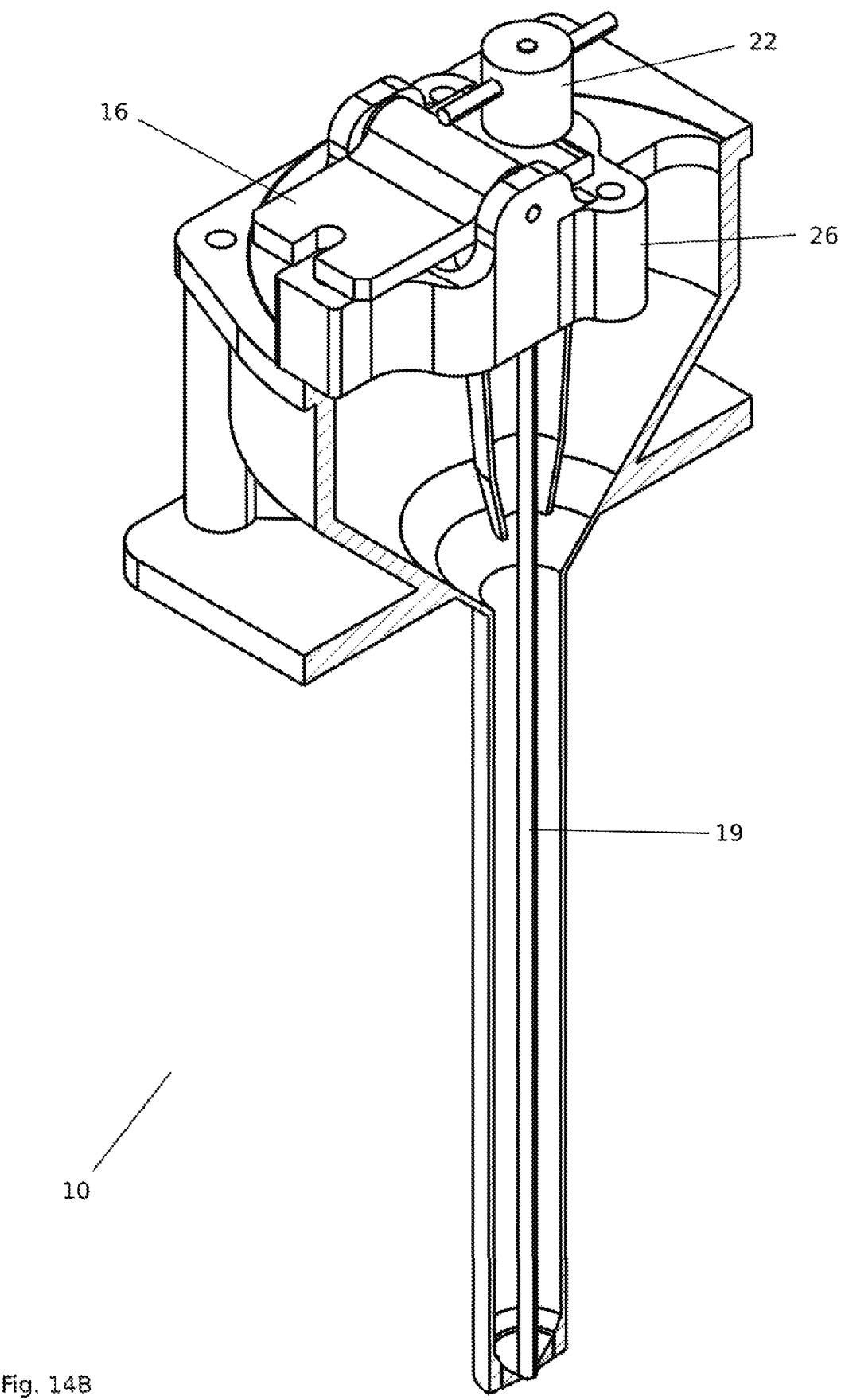
FIG. 14B, is a section view of the pourer of FIG. 14A.
Figure 14C:
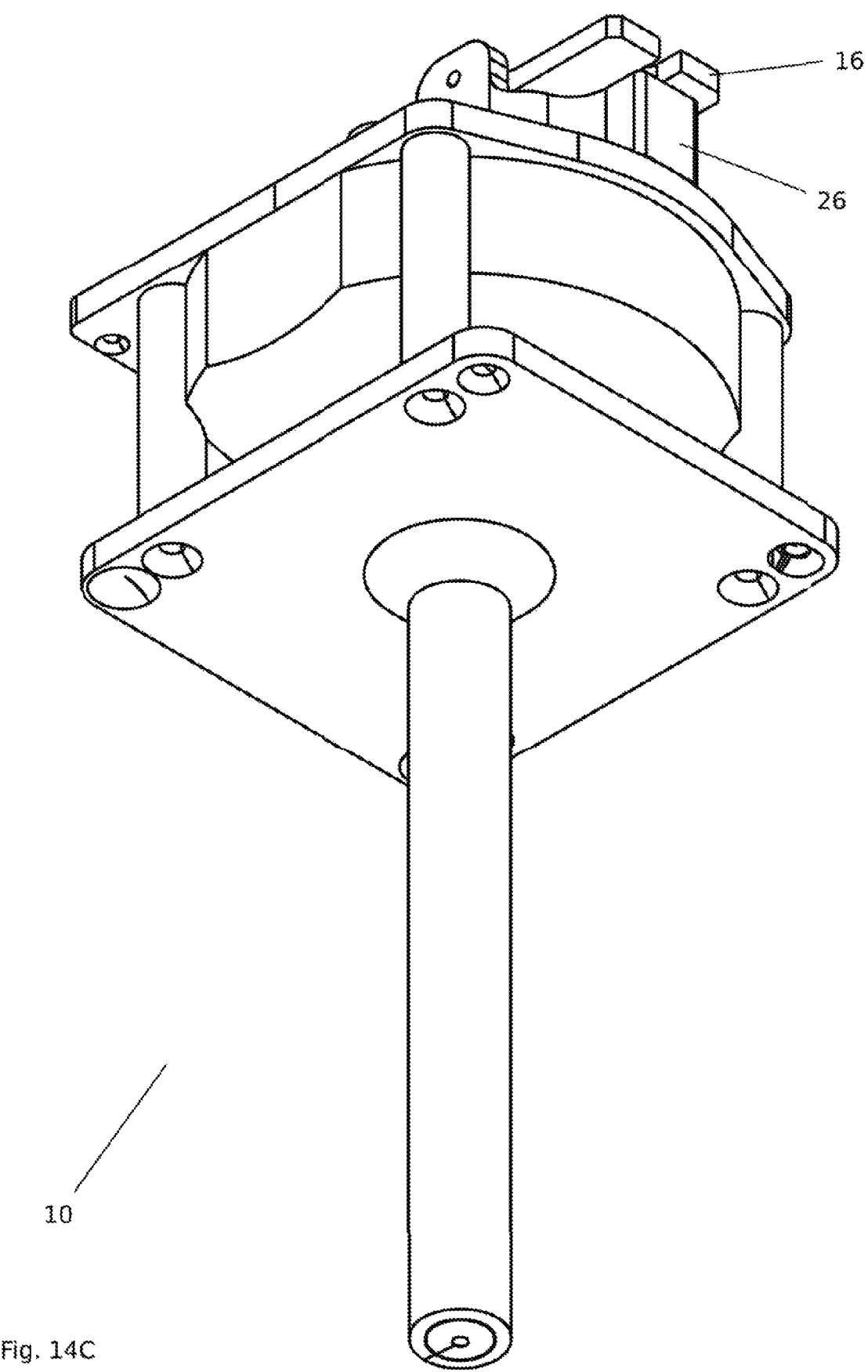
FIG. 14C, is a bottom angle isometric view of the pourer of FIG. 14A.

Referring to FIG. 12A, actuating arm 150, which is hinged to the fork assembly 105 at hinge 149, includes a downwardly extending push panel 156. When arm 150 is lowered, it presses down against pourer rocker arm 16 (FIG. 13A), which lifts up on ball bearing 18, in turn lifting pourer plug rod 19, permitting powder to flow out. When arm 150 returns to its raised position, pourer plug rod 19 is urged downwardly by spring 25, stopping the flow of powder, with hinged arm 16 and ball bearing 18 also returning to non-dispensing positions. There are some differences between the pourer 10, shown in FIGS. 13A-13C, and that shown in FIGS. 14A-14C. Hole 20 is smaller in that shown in FIGS. 13A-13C, for laying down a finer line of powder. Similar to the case for printer 8, when pourer 10 is on fork assembly 105, it rests on fork 106. The above noted movement of arm 150 is effected by a DC Motor 151 (FIG. 12B), which turns spool 154, pulling or releasing a steel cable 155 that is engaged with pulley 157 and anchored at a switch 152. Starting with arm 150 in its down position, push panel 156 rests on rocker arm 16, so that there is little tension in cable 155, which has placed switch 152, in its cable slack position. When it is required to stop dispensing powder, DC motor 151 turns spool 154 to reel in cable 155, thereby causing switch 152 to switch to its cable tense position (a transition that does not affect operation) and for cable to pull up on pulley 157, thereby pulling up on arm 150 which continues to rise until it contacts another switch (not shown) located along the path of arm 150, which creates a signal that stops the process. DC motor 151 maintains its position by the friction of an internal gear assembly and arm 150 stays in the same position until it is time to move arm 150 and dispense powder. When this action is required, DC motor 151, turns spool 154 so as to spool out cable 155, causing arm 150 to drop until panel 156 is resting on arm 16. At this point cable 155 goes slack enough so that switch 152 transitions to a cable slack position, which is perceived by computer 160, or in an alternative embodiment, just by controller board 161, causing the process to stop, with the DC motor again stopped in place.

Figure 10B:
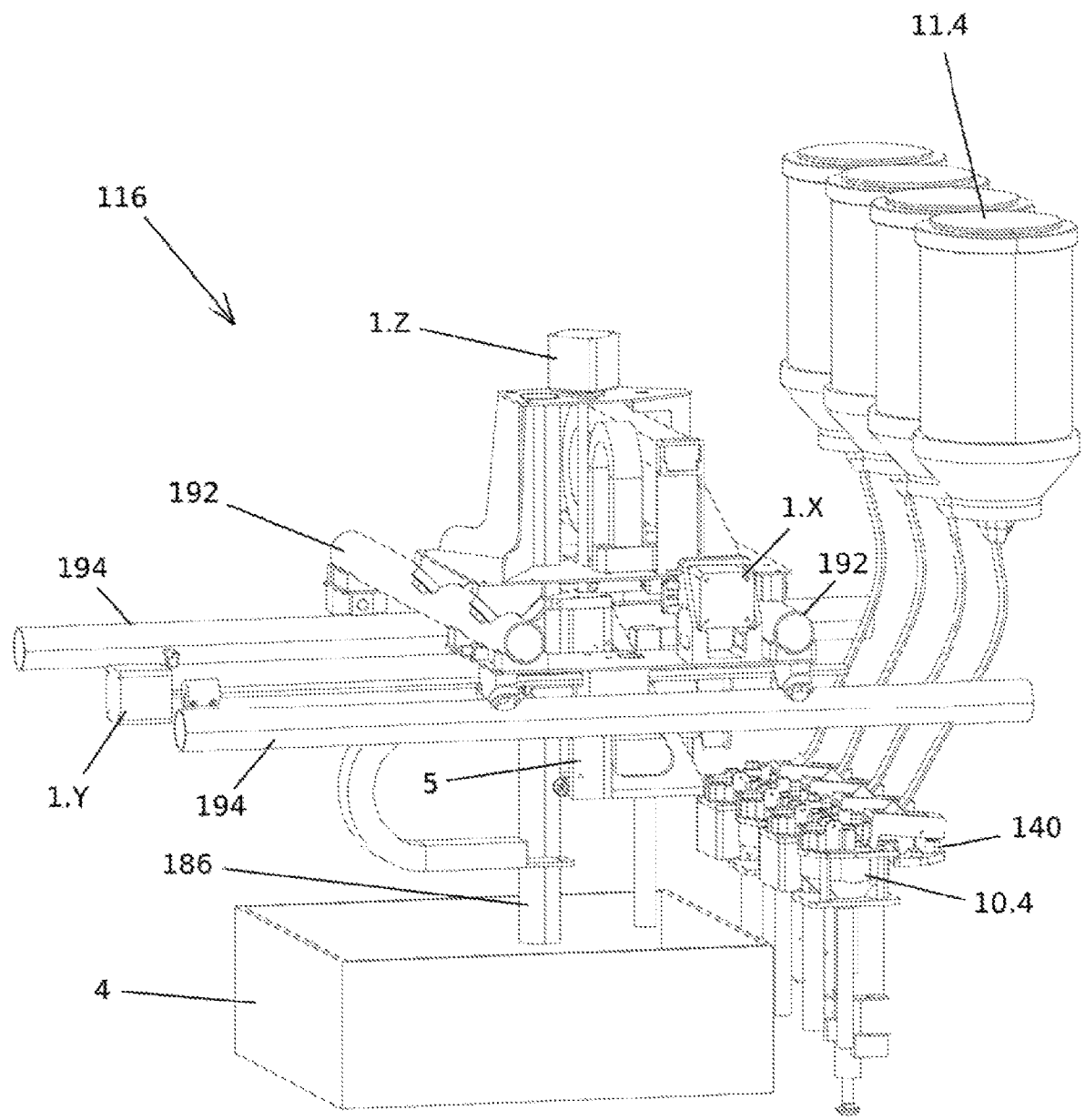
FIG. 10B is front-top-side isometric view of the printer portions of FIG. 10A, at a less steep angle of view.
Figure 11A:
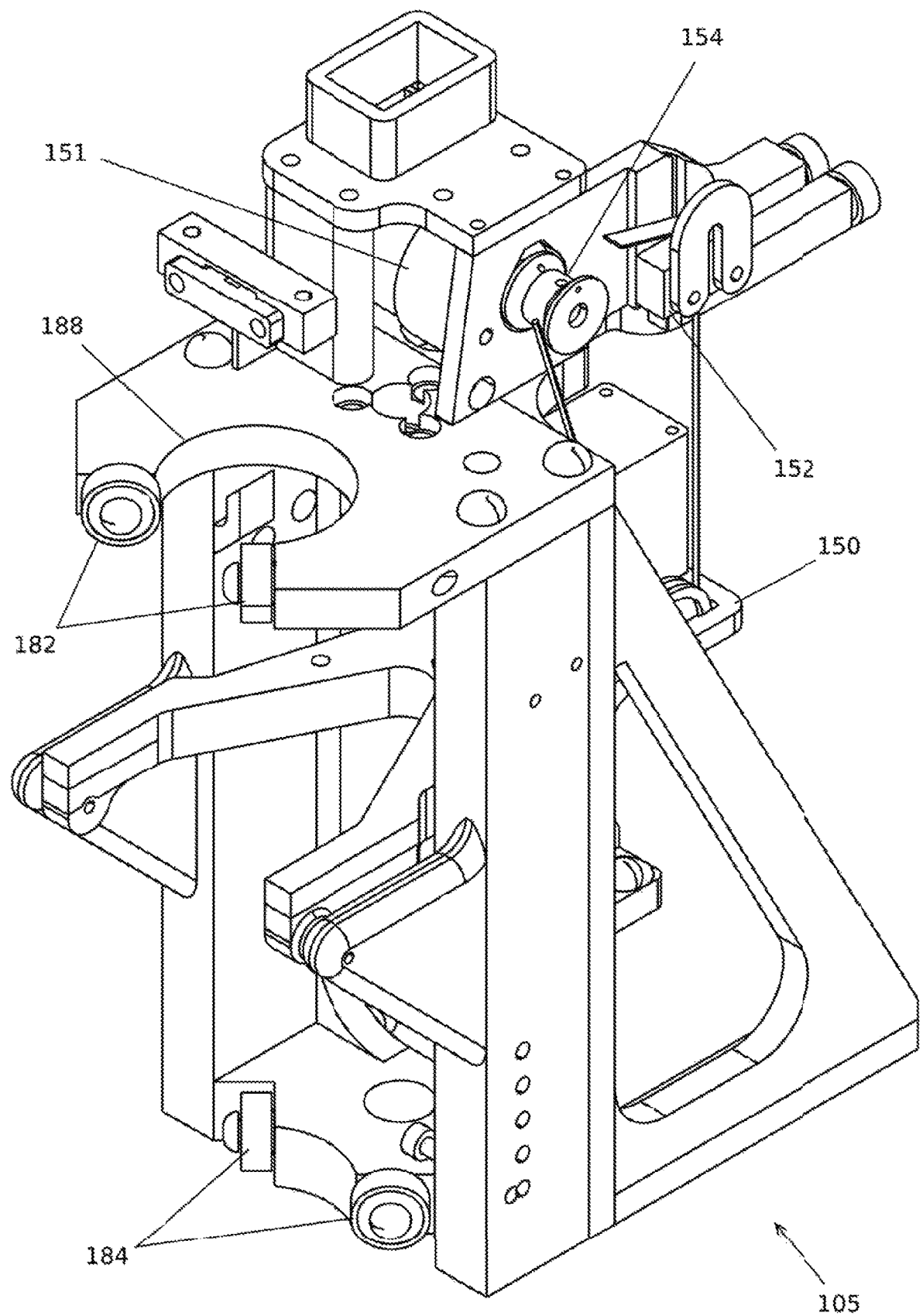
FIG. 11A is a front-top-side isometric view of a fork assembly, which forms a part of the printer of FIG. 9A.
Figure 11B:
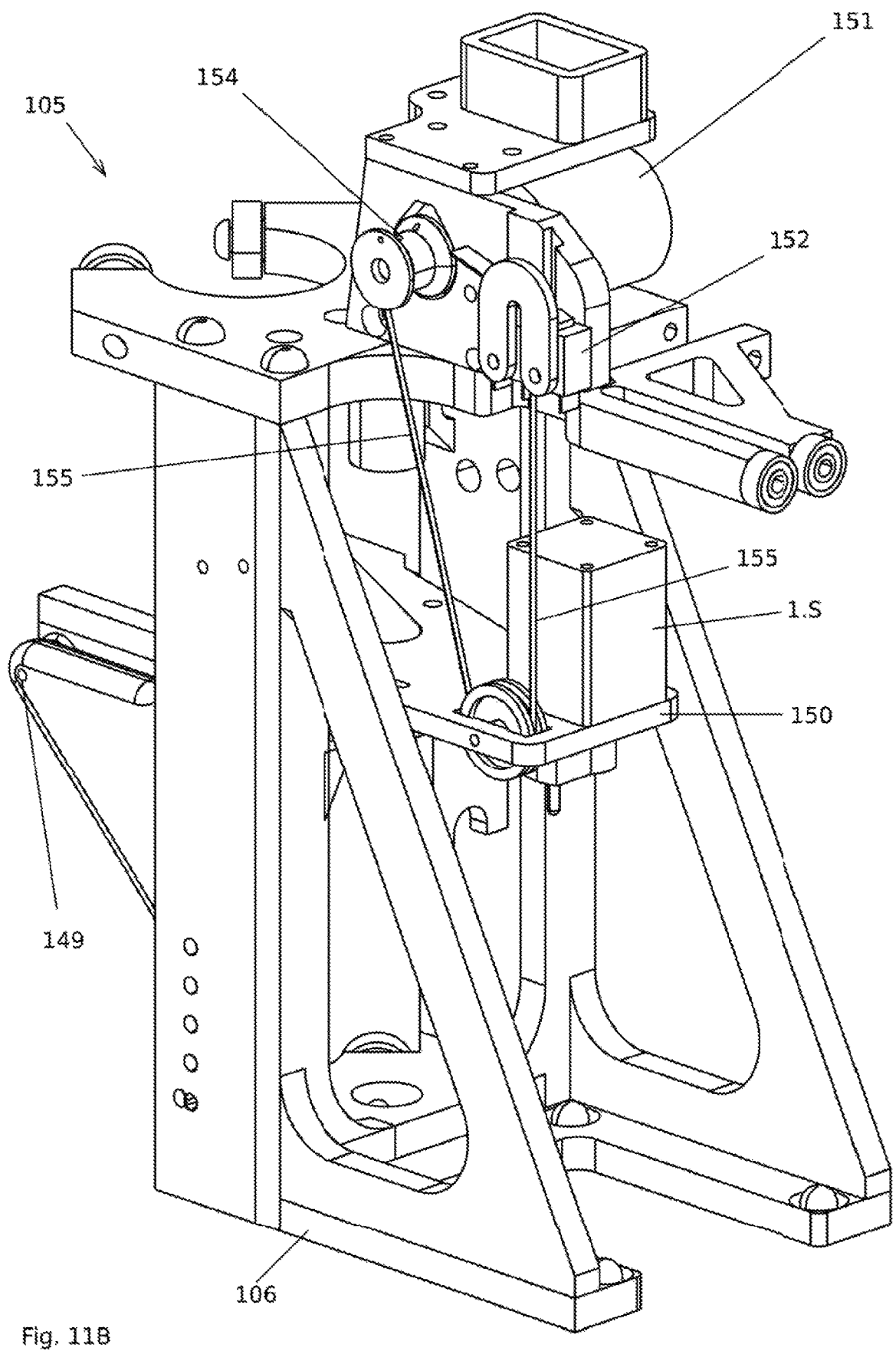
FIG. 11B rear-top-side isometric view of the fork assembly of FIG. 11A.
Figure 11C:
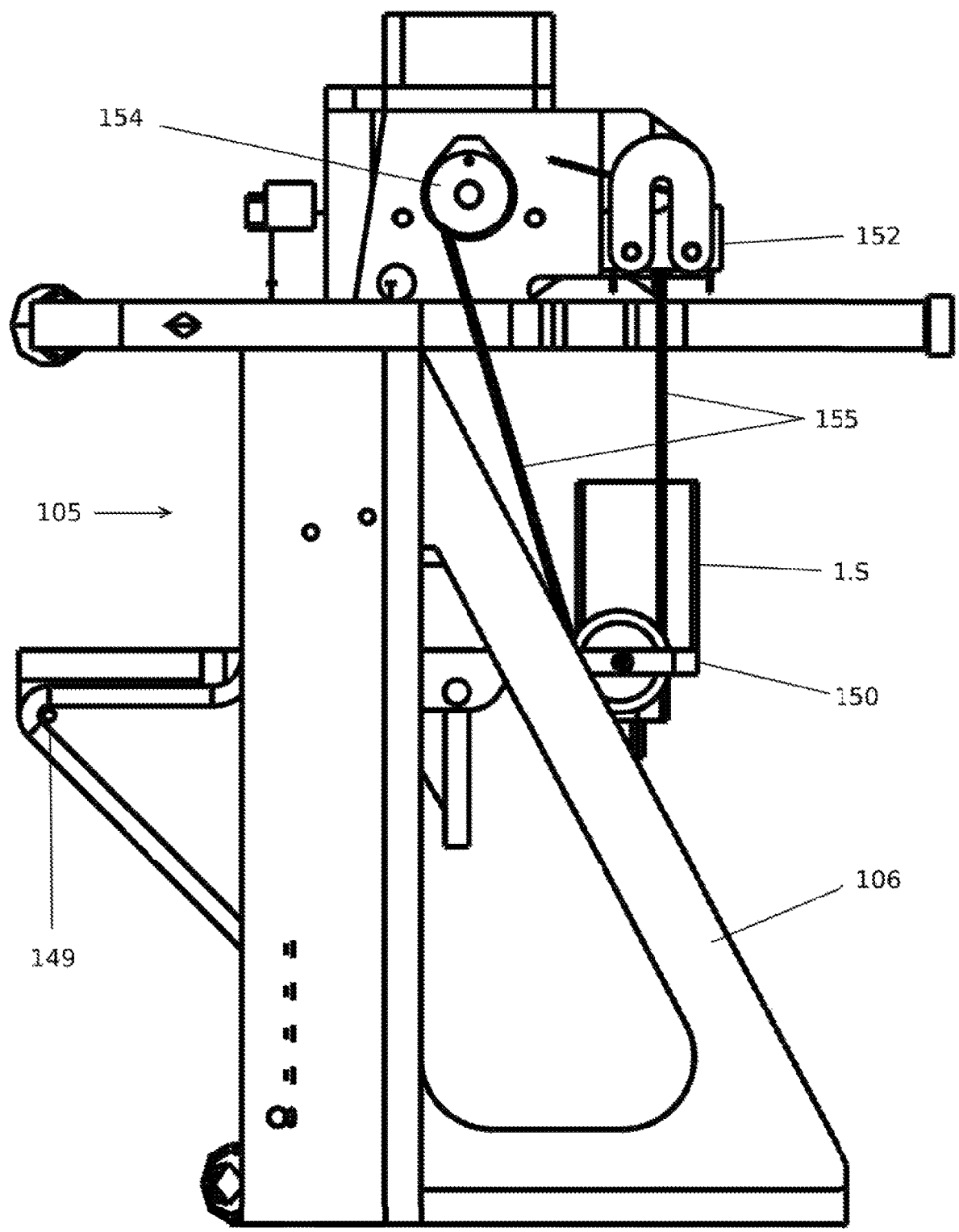
FIG. 11C is a side view of the fork assembly of FIG. 11A.

The fork assembly 105 rides vertically on a vertical tube 186 (FIG. 10B), which extends through partially enclosed space 188, with a pair of upper ball bearings 182 and lower ball bearings 184 smoothing the ride. Vertical tube 186 rides on a carriage 190, that is moved side-to-side on tubes 192 and forward and backward on tubes 194 (FIG. 10B). Tubes 192 and 194 provide a light weight but rigid framework for movement of carriage 190, and thereby fork assembly 105, which also moves on tube 186. As noted elsewhere, this movement is powered by motors 1.X, 1.Y and 1.Z.

Example 1

In one example the following parameters were used to produce a high carbon steel 3D printed object.
Build powder: IRON100
 The specification, and ordering information for IRON100 can be found on the Internet at: http://www.iron-powder.com/wp-content/uploads/2014/03/IRON100_Specifications.pdf
 Following is some information concerning IRON100:
  Chemical Analysis (by weight)
  Fe 99.5%+
  O 0.200%
  C 0.030%
  Si 0.030%
  Flow rate 29.00 sec/50 g
  Particle size <212 microns.
  Median particle size: 100 microns.
Support powder: OK85
 The specification for OK85, a product of USSilica, can be found at the following Internet address, and is also reproduced below.

http://www.ussilica.com/sites/ussilica.com/uploads/files/product-data-sheets/industry/foundry/OK85.pdf
Grain Shape: Round
Melting Point: 3100 Degrees F.
Mineral: Quartz
Typical Chemical Analysis: SiO2 (Silicon Dioxide) 99.8%
Particle size: <425 microns.
Median particle size: 150 microns.
SORELMETAL GRADE RF1

| Carbon | Silicon | Manganese | Phosphorus | Sulfur |
|--------|---------|-----------|------------|--------|
| 4.25% | 0.15% | 0.022% | 0.033% | 0.013% |

Available in an Ingot Size (Approx):

185×120×55 mm (7.25"×4.7×2.5)
Weight (Approx.):
5.54 kb (12 lbs.)
Pourer hole diameter: 1 mm for the smaller hole and 4 mm for the bigger hole.
Pourer horizontal moving speed while pouring (in millimeters per second):
Build: 2
Support: 8
Kiln settings:
Ramp: 600 degrees Celsius per hour
Hold temperature: 1250 degrees Celsius
Hold time: 4 hours Example 2

In another example similar parameters were used, except the following:
The OK85 powder was filtered to remove 25% of the largest and 5% of the smallest particles.
The IRON100 powder was filtered to remove 20% of the smallest particles.
Pourer hole diameter: 1 mm for the smaller hole and 2 mm for the bigger hole.
Pourer horizontal moving speed while pouring (in millimeters per second):
Build: 16
Support: 20
Kiln settings:
Ramp: 600 degrees Celsius per hour
Hold temperature: 1180 degrees Celsius
Hold time: 2 hours
Referring, now, to FIGS. 8A through 8D, after the process of filling pan 4 with build and support powder by the 3D printer is complete, a shelf 110, having an opening and being shaped to encourage liquid flow through the opening, is placed on top of this powder. A piece of pig 111 and a piece of coke 112 are placed on top shelf 110, and a lid 113 is placed over all of this. An inert particulate material, such as sand is then poured through a hole 114 in lid 113. This prevents shelf from riding up, and aids shelf in keeping the $SiO_2$ powder tightly packed, thereby preventing the molten pig from lifting the $SiO_2$.

INDUSTRIAL APPLICABILITY

The present invention finds industrial applicability in the manufacture of objects via 3D printing.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. An apparatus for dispensing build powder and support powder, in a sequence of layers, comprising:
   (a) a frame;
   (b) a container;
   (c) a build powder pourer, at least partially filled with build powder and a support powder pourer at least partially filled with support powder, each of said pourers having a dispensing opening and a dispensing plug, controllably covering said dispensing opening; and
   (d) a pourer-movement and dispensing plug-actuating assembly supported by said frame over said container, and including a movement element that is selectively attachable to said build powder pourer and alternately to said support powder pourer and also capable to controllably move an attached pourer in three orthogonal dimensions and to control said dispensing plug;
   (e) and at least one docking station for holding a first one of said pourers, while a second one of said pourers is attached to said movement element; and
   (f) a computing assembly, including an input for receiving a target three-dimensional shape, and controlling said pourer-movement and dispensing plug-actuating assembly to move said pourers and selectively open said plugs, thereby causing powder to be poured into said container, and to thereby create in said container a sequence of layers of build powder patterned with support powder that collectively form said target shape in build powder.

2. The apparatus of claim 1, wherein said apparatus further includes a first refill tank and at least a second refill tank, and wherein said first and second refill tanks are disposed to dispense powder into a pourer that is held by said at least one docking station, and wherein said first refill tank contains build powder and said second refill tank contains support powder.

3. The apparatus of claim 1, wherein said build powder pourer is a first build powder pourer and wherein said apparatus further comprises a second build powder pourer, wherein said first build powder pourer is a fine pourer with a first sized opening, and said second build powder pourer is a fast pourer with a second sized opening that is larger than said first opening.

4. The apparatus of claim 3, wherein said apparatus further comprises a third build powder pourer with an opening that is a third size that is larger than said second sized opening.

5. The apparatus of claim 1, wherein said apparatus further includes a refill tank for each pourer.

6. The apparatus of claim 1, wherein said pourers each includes a plug rod; and said pourer movement and dispensing plug actuating assembly includes a plug rod actuator that moves said plug rod vertically to open and close said opening.

7. The apparatus of claim 6, wherein said plug rod actuator includes an electric motor for providing the force to lift said plug rod.

8. The apparatus of claim 7, wherein said plug rod actuator, also periodically rotates said plug rod.

9. The apparatus of claim 1, wherein said support powder pourer is a first support powder pourer and wherein said apparatus further comprises a second support powder pourer, wherein said first support powder pourer is a fine pourer with a first sized opening, and said second support powder pourer is a fast pourer with a second sized opening that is larger than said first opening.

10. The apparatus of claim 9, wherein said apparatus further comprises a third support powder pourer with an opening that is a third size larger than said second sized opening.

11. The apparatus of claim 1, wherein said movement element includes a horizontal fork that is moved into engagement with a said pourer to engage said movement element with said pourer.

12. An apparatus for dispensing build powder and support powder, in a sequence of layers, comprising:
(a) a frame;
(b) a container;
(c) a first build powder pourer and a second build powder pourer, both at least partially filled with build powder and a support powder pourer at least partially filled with support powder, each of said pourers having a dispensing opening and a dispensing plug, controllably covering said dispensing opening; and
(d) a pourer-movement and dispensing plug-actuating assembly supported by said frame over said container, and including a movement element that is selectively attachable alternately to said first build powder pourer, said second build powder pourer and said support powder pourer and also capable to controllably move an attached pourer in three orthogonal dimensions and to control said dispensing plug;
(e) a computing assembly, including an input for receiving a target three-dimensional shape, and controlling said pourer-movement and dispensing plug-actuating assembly to move said pourers and selectively open said plugs, thereby causing powder to be poured into said container, and to thereby create in said container a sequence of layers of build powder patterned with support powder that collectively form said target shape in build powder; and
(f) wherein said opening of said second build powder pourer is larger than said opening of said first build powder pourer, permitting a more rapid dispensing of build powder.

13. The apparatus of claim 12, further including at least one docking station for holding a first one of said pourers, while a second one of said pourers is attached to said movement element.

14. The apparatus of claim 12, wherein said apparatus further includes a refill tank for each pourer.

15. The apparatus of claim 12, wherein said pourers each includes a plug rod; and said pourer movement and dispensing plug actuating assembly includes a plug rod actuator that moves said plug rod vertically to open and close said opening.

16. The apparatus of claim 15, wherein said plug rod actuator includes an electric motor for providing the force to lift said plug rod.

17. The apparatus of claim 16, wherein said plug rod actuator, also periodically rotates said plug rod.

18. The apparatus of claim 12, wherein said support powder pourer is a first support powder pourer and wherein said apparatus further comprises a second support powder pourer, wherein said first support powder pourer is a fine pourer with a first sized opening and said second support powder pourer is a fast pourer with a second sized opening that is larger than said first opening.

19. The apparatus of claim 18, wherein said apparatus further comprises a third support powder pourer with an opening that is a third size larger than said second sized opening.

20. The apparatus of claim 12, wherein said movement element includes a horizontal fork that is moved into engagement with a said pourer to engage said movement element with said pourer.

* * * * *